US011164381B2

(12) United States Patent
O'Brien et al.

(10) Patent No.: US 11,164,381 B2
(45) Date of Patent: Nov. 2, 2021

(54) CLOTHING MODEL GENERATION AND DISPLAY SYSTEM

(71) Applicant: GERBER TECHNOLOGY LLC, Tolland, CT (US)

(72) Inventors: James F O'Brien, El Cerrito, CA (US); David T Jackson, Redwood City, CA (US); Carlo Camporesi, Alameda, CA (US); Daniel Ram, Sunnyvale, CA (US); David Macy, San Francisco, CA (US); Edilson de Aguiar, San Francisco, CA (US); James L. Andrews, San Francisco, CA (US); Justin Lee, San Francisco, CA (US); Karen M Stritzinger, Oakland, CA (US); Kevin Armin Samii, Berkeley, CA (US); Nathan Mitchell, Richmond, CA (US); Tobias Pfaff, Oakland, CA (US); Scott M Frankel, Berkeley, CA (US)

(73) Assignee: GERBER TECHNOLOGY LLC, Tolland, CT (US)

( * ) Notice: Subject to any disclaimer, the term of this patent is extended or adjusted under 35 U.S.C. 154(b) by 0 days.

(21) Appl. No.: 16/179,697

(22) Filed: Nov. 2, 2018

(65) Prior Publication Data
US 2019/0130649 A1  May 2, 2019

Related U.S. Application Data

(60) Provisional application No. 62/581,009, filed on Nov. 2, 2017.

(51) Int. Cl.
| | |
|---|---|
| *G06T 19/00* | (2011.01) |
| *G06T 19/20* | (2011.01) |
| *G06F 17/50* | (2006.01) |
| *G06T 15/00* | (2011.01) |
| *G06Q 30/06* | (2012.01) |

(Continued)

(52) U.S. Cl.
CPC ............ *G06T 19/006* (2013.01); *G06F 30/00* (2020.01); *G06F 30/20* (2020.01);
(Continued)

(58) Field of Classification Search
CPC .. G06K 9/00664–00704; G06F 3/0481; G06F 3/04817; G06F 9/4443;
(Continued)

(56) References Cited

U.S. PATENT DOCUMENTS

| | | | |
|---|---|---|---|
| 5,495,568 | A | 2/1996 | Beavin |
| 7,662,648 | B2 | 2/2010 | Sandhu et al. |

(Continued)

FOREIGN PATENT DOCUMENTS

| | | |
|---|---|---|
| KR | 20090039091 | 4/2009 |
| KR | 1020090039091 | 4/2009 |

(Continued)

OTHER PUBLICATIONS

Aliaga, Carlos et al., "Sackcloth or Silk?: The Impact of Appearance vs Dynamics on the Perception of Animated Cloth", Proceedings of the ACM SIGGRAPH Symposium on Applied Perception (SAP '15). ACM, New York, NY, USA, 2015, 41-46.

(Continued)

*Primary Examiner* — Todd Buttram
(74) *Attorney, Agent, or Firm* — Day Pitney LLP; Andrew M. Riddles; George N. Chaclas

(57) ABSTRACT

An improved system to provide a clothing model in augmented reality and/or virtual reality is disclosed. In one embodiment, the system provides a fully simulated garment, on the user's device, in an augmented reality or virtual reality display. In one embodiment, the process uses a parameterized smart garment model which enables real-time interaction with the garment on a device such as a mobile phone or tablet, with limited memory and processing power.

(Continued)

In one embodiment, the system permits nearly instantaneous alteration of garment sizes. Because the garment is modeled to accurately reflect physical details, the lay of the garment changes as the size of the garment or body changes.

9 Claims, 21 Drawing Sheets

(51) Int. Cl.
*G06F 30/00* (2020.01)
*G06F 30/20* (2020.01)
*G06F 113/12* (2020.01)

(52) U.S. Cl.
CPC ....... *G06Q 30/0643* (2013.01); *G06T 15/005* (2013.01); *G06T 19/00* (2013.01); *G06T 19/20* (2013.01); *G06F 2113/12* (2020.01); *G06T 2210/16* (2013.01); *G06T 2219/2021* (2013.01)

(58) Field of Classification Search
CPC .. G06F 3/04847; G06F 11/3664; G06F 3/012; G06F 3/0304; G06F 3/011–015; G06T 19/00; G06T 17/00; G06T 19/006; G06T 2215/16; H04N 5/272; H04N 2201/3245; A63F 13/10
See application file for complete search history.

(56) References Cited

U.S. PATENT DOCUMENTS

| | | | |
|---|---|---|---|
| 8,364,561 | B2 | 1/2013 | Wolper et al. |
| 8,700,477 | B2 | 4/2014 | Wolper et al. |
| 9,310,883 | B2* | 4/2016 | Weising .................. G09G 5/08 |
| 9,665,906 | B2 | 5/2017 | Adeyoola et al. |
| 10,304,227 | B2* | 5/2019 | Colbert .................... G06T 11/00 |
| 2004/0049309 | A1 | 3/2004 | Gardner et al. |
| 2006/0031047 | A1 | 2/2006 | Bingham et al. |
| 2007/0046666 | A1 | 3/2007 | Kokojima et al. |
| 2009/0289940 | A1 | 11/2009 | Kimura et al. |
| 2010/0111370 | A1* | 5/2010 | Black .................. G06K 9/00369 382/111 |
| 2010/0305909 | A1 | 12/2010 | Wolper et al. |
| 2011/0273457 | A1 | 11/2011 | Aguiar et al. |
| 2011/0298897 | A1* | 12/2011 | Sareen .................... G06N 3/006 348/47 |
| 2013/0173226 | A1 | 7/2013 | Reed et al. |
| 2014/0225888 | A1 | 8/2014 | Bell et al. |
| 2016/0110595 | A1* | 4/2016 | Wang ................. G06K 9/00375 705/27.2 |
| 2016/0292779 | A1* | 10/2016 | Rose ........................ G06F 3/017 |
| 2017/0004567 | A1* | 1/2017 | Dutt .................... G06Q 30/0643 |
| 2017/0046769 | A1* | 2/2017 | Jackson ............. G06Q 30/0643 |
| 2017/0139824 | A1* | 5/2017 | Dragoljevic ........ G06F 12/0261 |
| 2017/0293705 | A1* | 10/2017 | Van der Velden .......................... G06F 17/5009 |
| 2018/0218513 | A1* | 8/2018 | Ho ............................ G06T 7/73 |
| 2019/0035149 | A1* | 1/2019 | Chen ......................... G06T 7/50 |
| 2019/0108458 | A1* | 4/2019 | Yu ........................... G06N 20/00 |

FOREIGN PATENT DOCUMENTS

| | | |
|---|---|---|
| WO | 0146911 A1 | 6/2001 |
| WO | 2016097732 A1 | 6/2016 |
| WO | 2017029487 A1 | 2/2017 |

OTHER PUBLICATIONS

Ari Rapkin, "How to Dress Like a Jedi: techniques for digital clothing", ACM SIGGRAPH 2002 conference abstracts and applications (SIGGRAPH '02). ACM, New York, NY, USA, 2002, 196-196.

Baraff, David et al., "Untangling Cloth", ACM SIGGRAPH 2003 Papers (SIGGRAPH '03). 2003. ACM, New York, NY, USA, 862-870, 9 pages.

Baraff, David et al., "Large Steps in Cloth Simulation", In Proceedings of the 25th annual conference on Computer graphics and interactive techniques (SIGGRAPH '98). 1998, ACM, New York, NY, USA, 43-54, 12 pages.

Berthouzoz, Floraine et al., "Parsing Sewing Patterns into 3D Garments", ACM Transactions on Graphics, vol. 32, No. 4, Article 85, Jul. 2013, 12 pages.

Bridson R. et al, "Simulation of Clothing with Folds and Wrinkles", In Proceedings of the 2003 ACM SIGGRAPH/Eurographics Symposium on Computer Animation (SCA '03), 2003, Eurographics Association, Aire-la-Ville, Switzerland, Switzerland, 28-36, 9 pages.

Brouet, Remi et al., "Design Preserving Garment Transfer", ACM Transactions on Graphics, vol. 31, No. 4, Article 36, Jul. 2012, 11 pages.

Carignan, M. et al., "Dressing Animated Synthetic Actors with Complex Deformable Clothes", Computer Graphics, 26, Jul. 2, 1992, 6 pages.

Choi, Kwang-Jin et al., "Stable but Responsive Cloth", In Proceedings of the 29th annual conference on Computer graphics and interactive techniques (SIGGRAPH '02). ACM, New York, NY, USA, 604-611, 8 pages.

Cordier, Frederic et al., "Made-to-Measure Technologies for an Online Clothing Store", IEEE Comput. Graph. Appl. 23, Jan. 1, 2003, 38-48, 11 pages.

de Aguiar, Edilson et al., "Stable Spaces for Real-Time Clothing", ACM Transactions on Graphics, vol. 29, No. 4, Article 106, Jul. 2010, 9 pages.

Eitan Grinspun et al., "Discrete Shells", Proceedings of the 2003 ACM Eurographics/SIGGRAPH Symposium on Computer animation (SCA '03). Eurographics Association, Aire-la-Ville, Switzerland, 2003, pp. 62-67, 7 pages.

Extended European Search Report, dated Feb. 14, 2019. (8 pages).

Goldenthal, Rony, et al. "Efficient Simulation of Inextensible Cloth", ACM Transactions on Graphics (TOG), Proceedings of ACM SIGGRAPH 2007, vol. 26 Issue 3, Jul. 2007, Article No. 49, 7 pages.

Grinspun, Eitan et al., "CHARMS: A Simple Framework for Adaptive Simulation", Proceedings of the 29th Annual Conference on Computer Graphics and Interactive Techniques (SIGGRAPH '02), 2002, ACM, New York, NY, USA, 281-290, 10 pages.

Igarashi, Takeo et al., 2007. "Clothing Manipulation", ACM SIGGRAPH 2007 courses (SIGGRAPH '07), Article 29, 2007, 10 pages.

Kavan, Ladislav et al., 2011. Physics-Inspired Upsampling for Cloth Simulation in Games. ACM Transactions on Graphics, vol. 30,No. 4, Article 93, Jul. 2011, 10 pages.

Kim, Doyub et al., "Near-exhaustive Precomputation of Secondary Cloth Effects", ACM Transactions on Graphics, vol. 32, No. 4, Article 87, Jul. 2013, 7 pages.

Kwok, Tsz-Ho et al., "Styling Evolution for Tight-Fitting Garments", IEEE Transactions on Visualization and Computer Graphics, vol. 22, No. 5, May 2016, 1580-1591, 12 pages.

Labelle, Francois et al., "Anisotropic Voronoi Diagrams and Guaranteed-Quality Anisotropic Mesh Generation", Proceedings of the Nineteenth Annual Symposium on Computational Geometry (SCG '03), 2003, ACM, New York, NY, USA, 191-200.

Li, Jituo et al., "Modeling 3D garments by examples", Computer-Aided Design 49, Apr. 2014, 28-41, 14 pages.

Li, Ling et al. 2005. "Cloth Animation with Adaptively Refined Meshes", Proceedings of the Twenty-eighth Australasian conference on Computer Science, vol. 38 (ACSC '05), Australian Computer Society, Inc., Darlinghurst, Australia, Australia, 107-113, 7 pages.

Luible, C. et al., "The Simulation of Cloth Using Accurate Physical Parameters", CGIM '08 Proceedings of the Tenth IASTED International Conference on Computer Graphics and Imaging, 2008, pp. 123-128.

Magnenat-Thalmann, N. et al., "Automatic Modeling of Virtual Humans and Body Clothing", Journal of Computer Science and Technology, Sep. 2004, vol. 19, No. 5, pp. 575-584, 10 pages.

(56) References Cited

OTHER PUBLICATIONS

Magnenat-Thalmann, N. et al., "Modelling of Bodies and Clothes for Virtual Environments", Proceedings of the 2004 International Conference on Cyberworlds (CW'04), 2004, 8 pages.
Magnenat-Thalmann, N. et al., "From Measured Fabric to the Simulation of Cloth", 10th IEEE International Conference on Computer-Aided Design and Computer Graphics, 2007, 12 pages.
Miguel, E. et al., 2012. "Data-Driven Estimation of Cloth Simulation Models", Computer Graphics Forum, vol. 31, No. 2, May 2012, pp. 519-528, 10 pages.
Willer, Matthias et al., "Wrinkle Meshes", Proceedings of the 2010 ACM SIGGRAPH/Eurographics Symposium on Computer Animation (SCA '10). Eurographics Association, Aire-la-Ville, Switzerland, Switzerland, 201, pp. 85-92.
Narain, Rahul, et al., "Adaptive Anisotropic Remeshing for Cloth Simulation", ACM Transactions on Graphics, vol. 31, No. 6, Article 152, pp. 1-10, Nov. 2012, 10 pages.
Narain, Rahul et al., "Folding and Crumpling Adaptive Sheets", ACM Transactions on Graphics, vol. 32, No. 4, Article 51, Jul. 2013, 8 pages.
NG, Hing N. et al., "Computer Graphics Techniques for Modeling Cloth", IEEE Comput. Graph. Appl. 16, Sep. 5, 1996, 28-41, 14 pages.
PCT Search Report for PCT/US18/59060 dated Feb. 11, 2019. 4 pages.
PCT Written Opinion for PCT/US18/59060, dated Feb. 12, 2019. 6 pages.
Robson, Cody et al., SMI 2011: Full Paper: "Context-aware garment modeling from sketches", Computers & Graphics, vol. 35, Issue 3, Jun. 2011, 604-613, 24 pages.
Rohmer, Damien et al., "Animation Wrinkling: Augmenting Coarse Cloth Simulations with Realistic-Looking Wrinkles", ACM Transactions on Graphics, vol. 29, No. 6, Article 157, Dec. 2010, 8 pages.
Umetani, Nobuyuki et al., 2011. "Sensitive Couture for Interactive Garment Modeling and Editing", In ACM SIGGRAPH 2011 papers (SIGGRAPH '11), 2011, Hugues Hoppe (Ed.). ACM, New York, NY, USA, Article 90, 12 pages.
Volino, Pascal et al., 1995. "Versatile and Efficient Techniques for Simulating Cloth and Other Deformable Objects", In Proceedings of the 22nd annual conference on Computer graphics and interactive techniques (SIGGRAPH '95), 1995, Susan G. Mair and Robert Cook (Eds.). ACM, New York, NY, USA, 137-144, 8 pages.
Volino, P. et al., "The Evolution of a 3D System for Simulating Deformable Clothes on Virtual Actors", IEEE Computer Graphics and Applications, 1996, 21 pages.
Volino, Pascal et al., "A Simple Approach to Nonlinear Tensile Stiffness for Accurate Cloth Simulation", ACM Transactions on Graphics, vol. 28, No. 4, Article 105, Aug. 2009, 16 pages.
Volino, Pascal et al., "From early virtual garment simulation to interactive fashion design", Computer-Aided Design 37, May 6, 2005, 593-608, 16 pages.
Volino, Pascal. et al., "Interactive Cloth Simulation: Problems and Solutions", Virtual Worlds on the Internet, IEEE, 1998, pp. 175-192.
Wang, Huamin et al., "Multi-Resolution Isotropic Strain Limiting", ACM Transactions on Graphics, vol. 29, No. 6, Article 156, pp. 1-10, Dec. 2010, 10 pages.
Wang, Huamin et al., "Data-Driven Elastic Models for Cloth: Modeling and Measurement", ACM Transactions on Graphics, vol. 30, No. 4, Article 71, pp. 1-11, Jul. 2011, 11 pages.
Wei-Wen Feng, Yizhou Yu, et al.,"A Deformation Transformer for Real-Time Cloth Animation", ACM Transactions on graphics, vol. 29, No. 4, Article 108, Jul. 2010, 9 pages.
Wicke, Martin et al., "Dynamic Local Remeshing for Elastoplastic Simulation". ACM Trans. Graph. 29, 4, Article 49, Jul. 2010, 11 pages.

\* cited by examiner

CLOTHING MODEL GENERATION AND DISPLAY SYSTEM

RELATED APPLICATIONS

The present application claims priority to U.S. Provisional Application No. 62/581,009, filed on Nov. 2, 2017, and incorporates that application by reference in its entirety. The present application incorporates by reference U.S. patent application Ser. No. 15/232,783, filed on Aug. 9, 2016, which claims priority to U.S. Provisional Application No. 62/203,381, filed on Aug. 10, 2015.

FIELD

The present invention relates to building and displaying a computer representation of how a garment will fit onto a human body.

BACKGROUND

Purchasers of clothing generally want to make sure that the item will fit, will be flattering, and will suit them well. Traditionally, the person would go to a store, try on clothing, and see if it worked on their body, and moved properly. However, more and more commerce is moving online, and people are shopping for clothes online as well. While a photo of the clothing on a mannequin or human model can show what the clothing looks like on the mannequin or model's body, it does not generally provide enough information for a shopper to see how that item of clothing would lay on his or her own specific body, or how the clothing would move as he or she wears it. Viewing the clothing on a mannequin or model's body also requires that the garment physically exist. A person ordering a custom-made garment may be ordering a garment that does not yet physically exist, and that may be designed and/or manufactured only once the order has been placed.

Similarly, clothing designers want to be able to see the clothing on a mannequin or fitting model. Currently this requires making separate evaluation samples and fitting them on a physical mannequin or human fitting model. This physical process can be time consuming and expensive, and it makes working with others who are not in the same location difficult, if not impossible.

BRIEF DESCRIPTION OF THE FIGURES

The present invention is illustrated by way of example, and not by way of limitation, in the figures of the accompanying drawings and in which like reference numerals refer to similar elements and in which.

DETAILED DESCRIPTION

Figure 1:
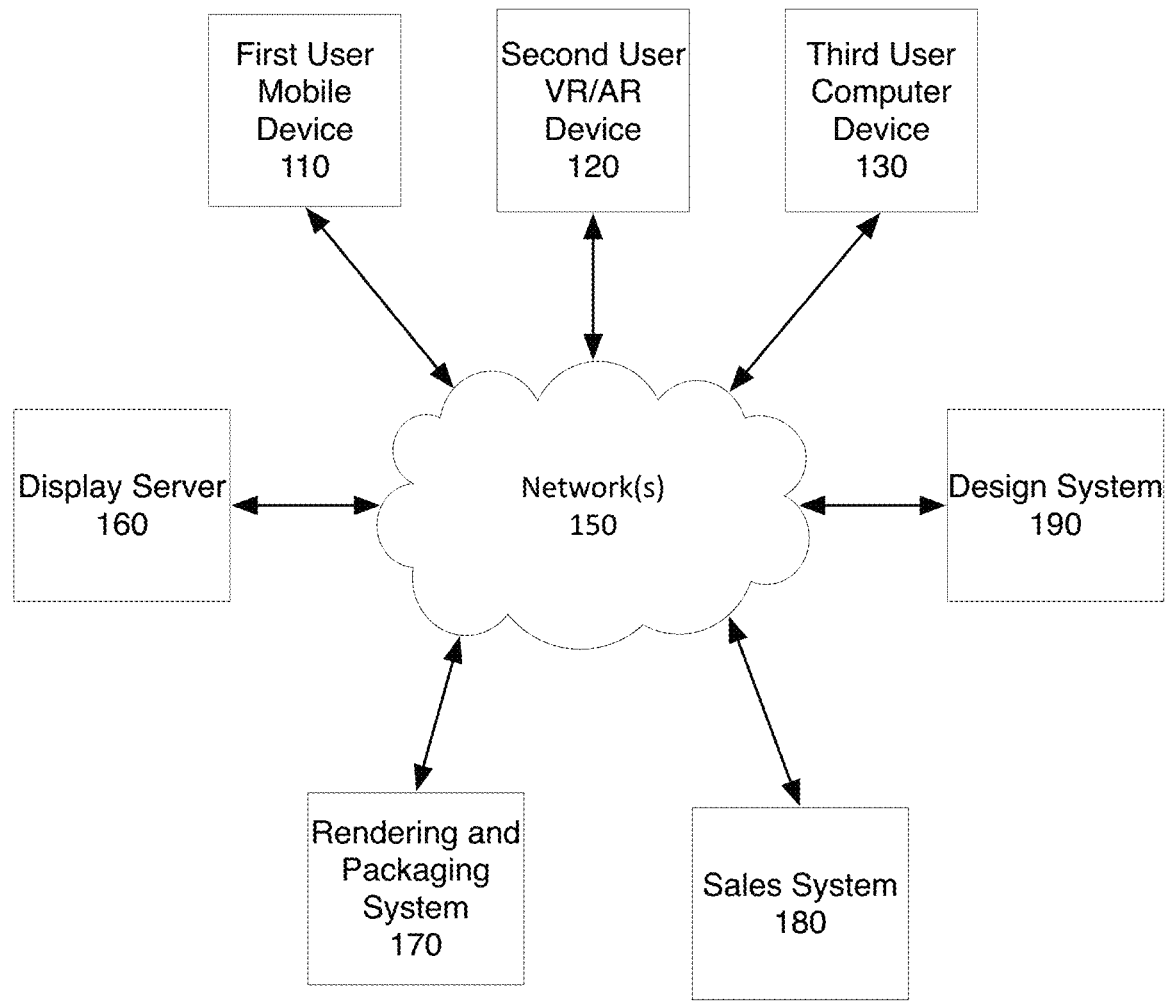
FIG. 1 is a network diagram of one embodiment of the various systems that may interact in the present invention.

The present application discusses an improved system to display a clothing model in augmented reality and/or virtual reality. The display and interaction system enables a user to have a better experience with a simulated garment model. In one embodiment, the system provides a fully simulated garment, on the user's device, in an augmented reality or virtual reality display. As used herein, the term "augmented reality or virtual reality" is intended to encompass any of modes that display virtual data composited with a camera view, modes that display virtual data optically superimposed over a direct view of the real world, and modes that only display virtual data. Virtual reality (VR) means the displayed item, such as a garment and model, are shown in a virtual scene. Augmented reality (AR) means that the surroundings include real-world elements as well as rendered elements. For simplicity, for the present application, references to VR is intended to include AR, and vice versa. In one embodiment, the process uses a parameterized smart garment model which enables real-time interaction with the garment on a device such as a mobile phone or tablet, with limited memory and processing power.

In one embodiment, a user experience may include the ability to simultaneously view multiple models, with a garment in different sizes and configurations. In one embodiment, the system permits nearly instantaneous alteration of garment sizes. In one embodiment, the system permits nearly instantaneous changes to the body's size and proportions. In one embodiment, these adjustments may be provided via a slider, direct manipulation, or another method that provides a visual experience of the alterations as sizes increase or decrease. Because the garment is modeled to accurately reflect the material and visual properties of the clothing on the body model, the appearance and lay of the garment changes as the size or proportions of the garment or body changes. This realistic simulation is useful to provide information to a user of how a garment appearance would change, on different users or at different sizes.

In one embodiment, in a VR or AR environment, the user may walk around the body model with the garment(s), as well as go closer to or further from the body model. In one embodiment, the system enables moving the body model, scaling the body model, and/or posing the body model using gestures. Gestures may be detected using a touch-sensitive screen, handheld tracker devices, a camera, a depth camera, or other input or sensor device.

In one embodiment, the overall scale of the body model and clothing may be changed so that the apparent size in the VR or AR environment may vary from life sized to miniature to gigantic. Life size is useful for providing the user with an intuitive understanding of the garment and the aesthetics of its appearance on the body. Miniature size is useful for viewing one or more bodies with garments in a space of limited size or when the user does not wish to walk around a life sized model. Larger than life sizes are useful for providing closeup views of details.

In one embodiment, the ability to zoom in to details of the body and garment is enabled by utilizing a multi-resolution texture map. A set of 3D models with different levels of detail may also be used. When viewed from far or at miniature scale, a low-resolution texture map and/or low-resolution model provide for better graphics performance and allow faster loading times. The high-resolution texture map and high-resolution 3D model allows for close inspection of details. In one embodiment, the texture-maps and 3D models may be loaded in a progressive fashion starting with the lowest resolution versions and progressing to the higher-resolution versions. This progression minimizes the time from user selection to presentation of the first image, and as higher-resolution data becomes available the rendering improves.

In one embodiment, one way of customizing a body model to match the user may use a silhouette outline overlaid on the user's camera-captured image. The image may be a previously acquired photograph or video, or it may be live video acquired by a mobile or other device that incorporates a camera. This enables the user to adjust the body model, to match the user's own body shape. In one embodiment, sliders, other interface widgets, or direct manipulation, may be used to adjust a plurality of measurement points, such as height, waist, hips, etc. In one embodiment, the user may enter an initial set of a few measurements (for example height, weight, and waist size, and then may further adjust the body model using this tool. This enables the body model to represent the user's body shape. In one embodiment, this enables the system to account for muscularity, overall body type (e.g. apple, pear, endomorph, ectomorph, etc.), and any other features which may be relevant to showing how clothing would appear on the user, within the system.

In one embodiment, the system permits sharing of an image, either through AR or VR. In one embodiment, this means that two or more user devices may show the same scene containing the garment, body model, and other objects. Each user's device generates an appropriate image depicting a view of the scene as seen from the virtual position of the user's device. In one embodiment, the two or more devices may be mutually aligned based on visual landmarks, to match the scene and object. In one embodiment, this may be particularly useful to users designing garments in cooperation with others who are not present in the same location. In one embodiment, for such image sharing, a representation of the user within the scene may also be provided. When users are not at the same location, in one embodiment, the garment and body models seen by each user may be the same, but they may be overlaid into the real world environment of each user.

In one embodiment, for designing garments, or when working with alterations, the system may provide an annotation capability. An annotation capability enables the user to attach annotations to a garment model. The annotations may be associated with a specific location on the garment. In one embodiment, the annotations may further be associated with a specific body model pose.

The following detailed description of embodiments of the invention makes reference to the accompanying drawings in which like references indicate similar elements, showing by way of illustration specific embodiments of practicing the invention. Description of these embodiments is in sufficient detail to enable those skilled in the art to practice the invention. One skilled in the art understands that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

FIG. 1 is a network diagram of one embodiment of the various systems that may interact in the present invention. The system includes at least one client device, such as first user mobile device 110, second user VR/AR device 120, or third user computer device 130. Of course, a single user may have mobile devices, computer devices, and VR/AR devices. In one embodiment, any number of users may interact with the system.

The devices 110, 120, 130 obtain garment data for display from display server 160. This is obtained in one embodiment through network 150, which may be a wireless, wired, cellular and/or other type of network 150. In one embodiment, parameterized smart garment model is sent to the client device for display. The generation and sending of such models is described in more detail below.

In one embodiment, the data is generated by rendering and packaging system 170. Display server 160 serves the data to the various user devices. In one embodiment, rendering and packing system 170 receives the data from a data generation system (not shown). In one embodiment, the system described in co-pending application U.S. Ser. No. 15/232,783, filed on Aug. 9, 2016 (hereinafter referred to as the Rendering Application) may be used to obtain the data for the garments and body models. That application is incorporated herein by reference in its entirety.

Sales system 180 in one embodiment works with display server 160 to enable a user to purchase garments. In one embodiment, design system 190 enables interaction with the garments to create updated garment designs. In one embodiment, design system 190 may interact with manufacturing systems, and other systems on the creation-side of clothing.

Figure 2:
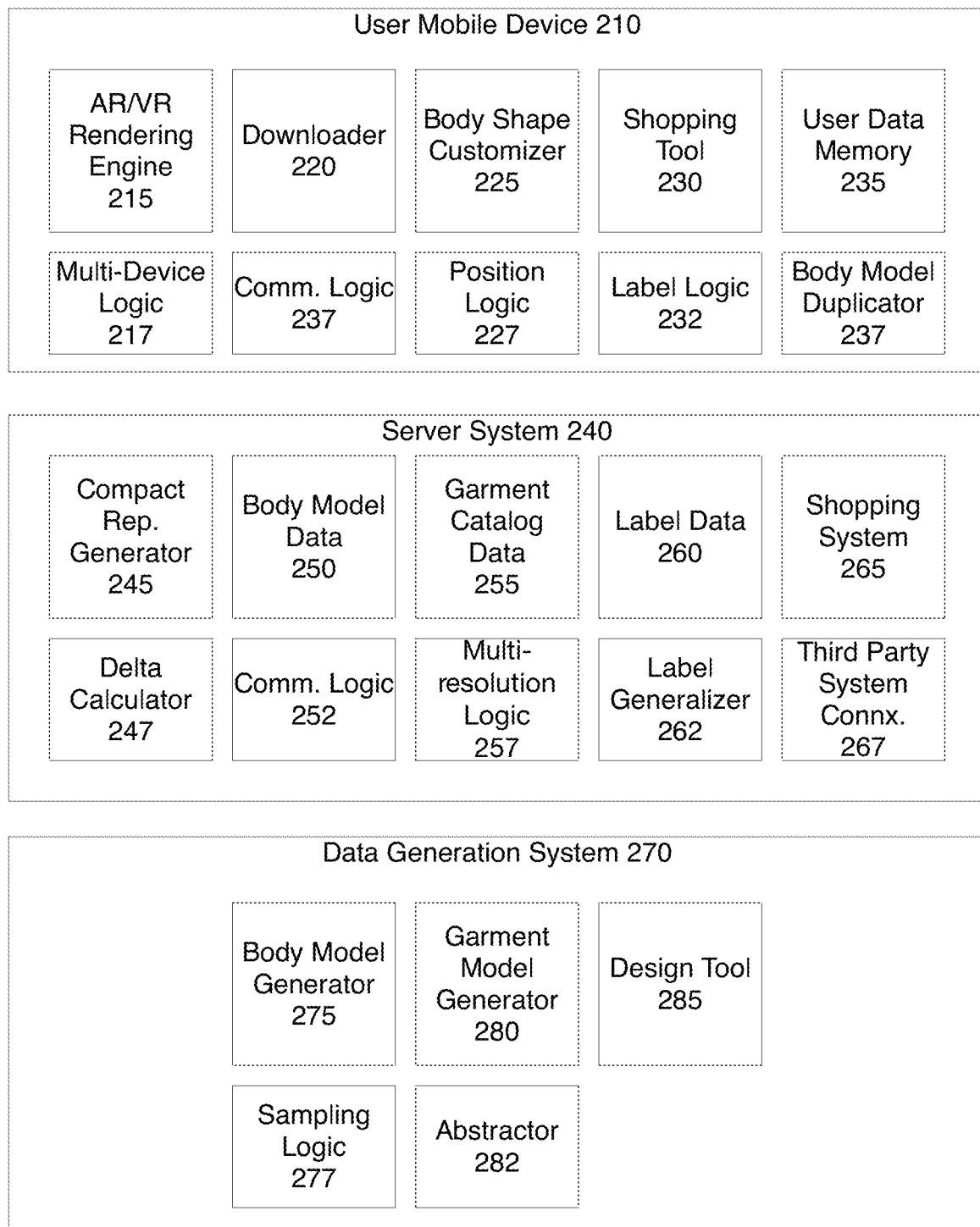
FIG. 2 is a block diagram of one embodiment of the system.

FIG. 2 is a block diagram of one embodiment of the system.

Figure 3:
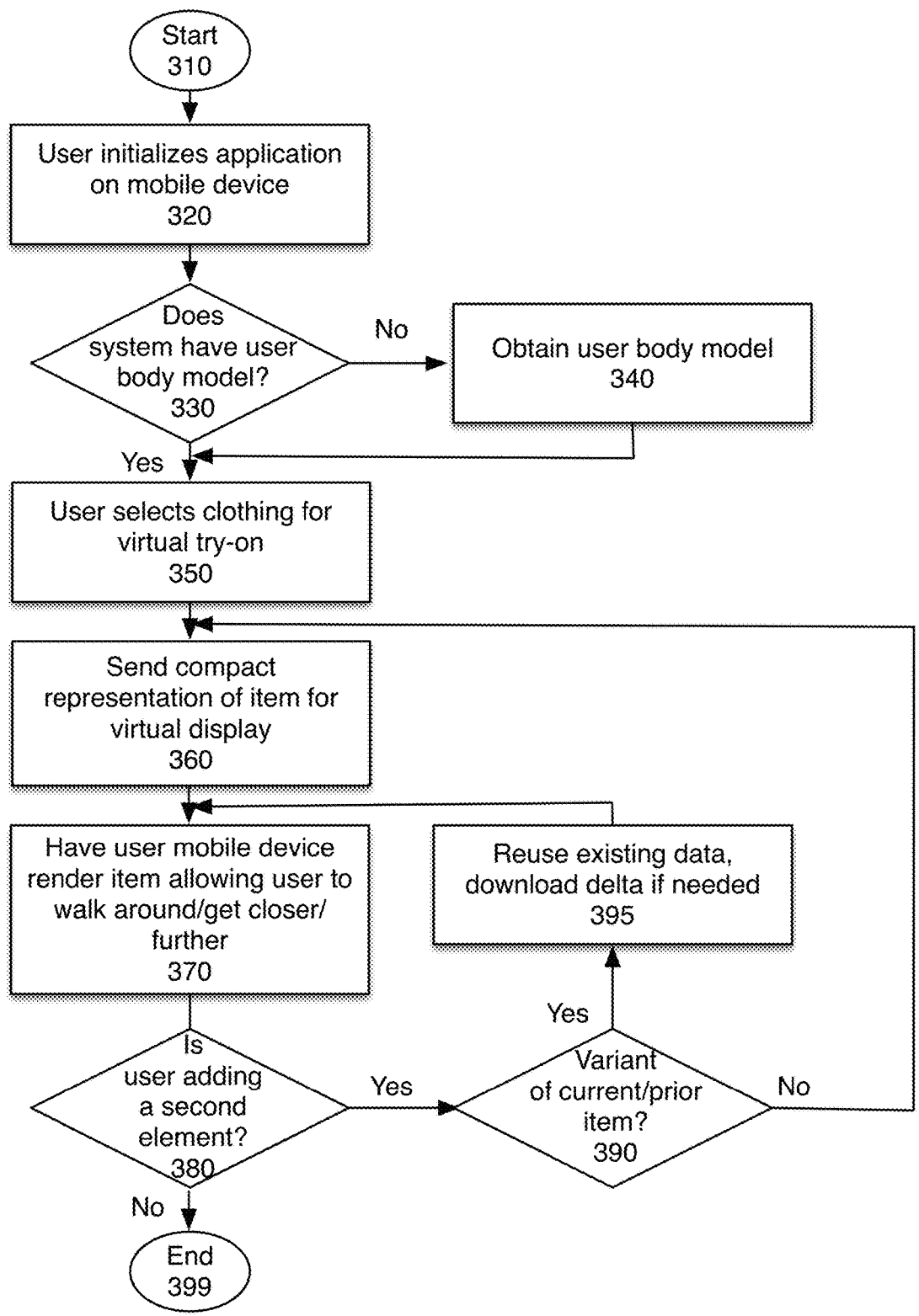
FIG. 3 is an overview flowchart of displaying a body model and garment in a virtual or augmented reality environment.

FIG. 3 is an overview flowchart of one embodiment of displaying a body model and garment in a virtual or augmented reality environment. The process starts at block 310. In one embodiment this process is utilized when the user starts the mobile application for showing the body models. This may be a particular store's customized mobile application, or a generally branded application which permits trying on clothing from various vendors. The application may also be built using technology such as HTML5 or WebGL or a similar system that allows the application to run in a web browser without installing a separate standalone application. The application may also run on a virtual reality headset that has an integrated computing system.

At block 320, the user initializes the application on the user's device. In one embodiment, this may be through a custom application, or by accessing the service through a browser or similar mechanism.

At block 330, the process determines whether the user has a body model. In one embodiment, the user creates a body model once, and it is available through all applications which interact with the server. In one embodiment the parameters the specify the user's proportions may be stored on the user's device for use when interacting with various applications or servers. In one embodiment, the user logs in, and their data is saved. In one embodiment, the user may modify the stored body model at any time, for example if the user is growing, gaining or losing weight, building muscle or changing in some other way that may impact how clothing fits on them. If the system does not yet have a body model for the user, the process continues to block 340.

At block 340, the system obtains a body model. In one embodiment, a separate application is used. In one embodiment, the application redirects the user to a feature that enables the definition of the body model. Alternately, the user may connect the application to their account where a body model is already defined. The process then continues to block 350. If the user already has a body model, the process continues directly to block 350.

At block 350, the user selects an item of clothing for trying on. In one embodiment, the user is provided a list of items of clothing, and selects a style and size.

At block 360, a compact representation of the items is sent to the user's device for virtual display. One embodiment of generating such a compact representation is described below.

At block 370, the user mobile device renders the item, allowing the user to walk around it, get closer or further, based on interaction with the virtual representation. In one embodiment, the virtual representation is initially displayed at a standard distance. In one embodiment, that distance may be 3 feet from the user's position. The user can then approach, back away, and walk around the representation and have the system maintain the representation as if it were a real item of clothing being displayed on a mannequin.

At block 380, the process determines whether the user is adding a second element. A second element may be a different size of the same item, a different color or fabric, another variation, or an entirely different garment. In another embodiment, the second element may be another item of clothing, either added to the outfit or in place of the outfit. If no additional clothing item is added, the process ends at block 399.

If an additional clothing item is added, at block 390, the process determines whether the additional item is a variation of a current or prior displayed item, which remains available on the mobile device. If not, the process continues to block 360 requesting the download of the compact representation of the item.

If the new item is a variation of an existing item still in cache, the process at block 395 reuses the existing data, downloading only the delta in the representation. This delta, in one embodiment, represents the change in the appearance of the garment based on the variation.

The process then returns to block 370 to render the new item on the user device. In one embodiment, the new item may be rendered next to, or in place of, the prior rendered element. As will be discussed below, the user may optionally view multiple variations of an item next to each other. For example, to see how the clothing would look in the various sizes, on the same body.

In this way, the system can provide the user an interactive VR/AR clothing display system on a mobile device, despite the bandwidth and processing limitations of such mobile devices.

Figure 4:
FIG. 4 shows an exemplary body model with clothing in an Augmented Reality display environment.

FIG. 4 shows an exemplary body model with clothing in an Augmented Reality display environment. As can be seen the image is shown in the user's real environment, in an AR-type display. The user can walk around the body model, get closer and farther, look up and down, as if seeing the item in a store on a mannequin. But unlike a mannequin, this body model is matched to the user's own body, rather than a mannequin with an idealized perfect body, which is typically six feet tall, with a 34-inch bust, 24-inch waist, and 34-inch hips, and extremely narrow calves, ankles, and wrists. In one embodiment, the user may purchase the item after viewing it on the display. In one embodiment, as will be further described below, the user may change the item size. Other features which may be available will be discussed below.

While a user may generally be interested in viewing clothing on a body model representing his or her own size and proportions, users may also wish to view clothing on other body models. For example, a designer may wish to view the garment on a multitude of bodies representing the anticipated buyers for whom the designer is designing the clothing. Another example would be a user shopping for another person. In these cases, the body model accessed by the system may not be the user's own body model, but may be another body model specified by the user. There may be a data protection system or access control system in place so that a user can control which other users would have access to the user's body model and associated data.

Figure 5:
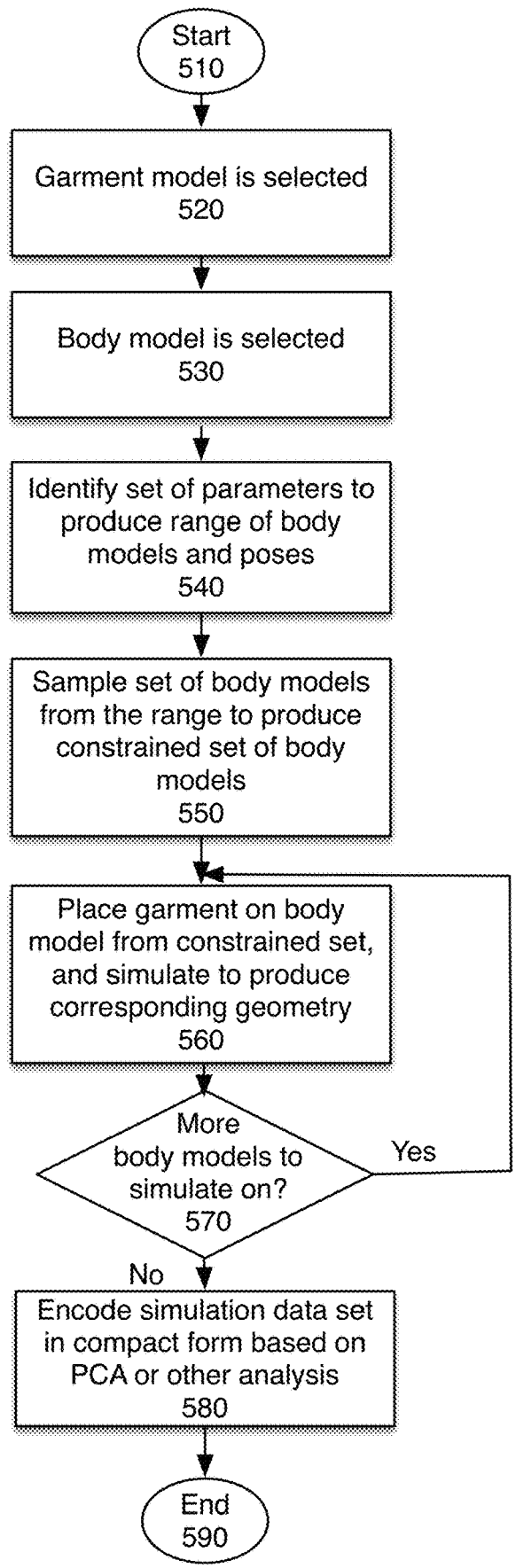
FIG. 5 is a flowchart of one embodiment of generating a parameterized smart garment model of a garment.

FIG. 5 is a flowchart of one embodiment of generating a parameterized smart garment model of a garment. At block 520, a garment model is selected. In one embodiment, the garment model represents a particular garment, in a particular size. In one embodiment, the process described in the Rendering Application is used to obtain the garment model.

At block 530, a body model is selected. In one embodiment, the base body model is selected to match the target audience of the garment. For example, a garment sold by a company targeting athletic young women may have a different body model selection than a company targeting middle aged professional women. In one embodiment, if the user's data is known, e.g. the user's body model data is available, the user's body model is selected. One embodiment of obtaining that data is described below.

At block 540, a set of parameters is identified that would produce a range of body models and poses. In one embodiment, the parameters define the body model shape, and the changes to the shape in the different poses. For example, if the parameters of a body model were just height, weight, and hips, and the parameters of a pose were just leg angle and arm angle, then each parameter would have a range. For example, height might have a range of 3' to 7', weight may range from 50 lb to 400 lb, etc. Collectively the product of the ranges for each parameter would be the multi-dimensional range for any possible body. In one embodiment, the system may use 20-30+ parameters for the body shape, and a similar number of parameters for the pose.

At block 550, a large set of body models is sampled from the range. This produces a constrained set of body models. Based on the number of parameters, and interval size, there would be an astronomical number of variations. Therefore, in one embodiment, a process of random sampling is used. There might be several thousand or even several million of these random sample bodies in the constrained set, but that is a feasible number to work with using a computer system. Properly selected random samples correctly represent the variability in the full set of possible bodies.

At block 560, the garment is placed on the body model from the constrained set, and the simulation is run to produce a geometry corresponding to the garment model on that body model. At block 570, the process determines whether there are more body models in the constrained set to evaluate. If so, the process returns to block 560 to evaluate the next data set. Otherwise, the process continues to block 580.

At block 580, all of the resulting geometries are analyzed using a technique such as principal component analysis (PCA), multilinear PCA, Singular Value Decomposition (SVD), or similar method. These methods will produce a set of basis vectors that can be used for compactly encoding the geometry of a model. Each model is represented with a polygon mesh, subdivision surface, NURBS (non-uniform rational b-spline) surface, tetrahedral mesh, or other surface or volume encoding. In one embodiment, if the models do not share the same topology then they may be resampled onto a common topology. Different topologies may occur as a result of using dynamic/adaptive meshing or remeshing algorithms, because the simulations are run from different input meshes, with different software configurations, or for other reasons. By resampling the models, the process produces models with a shared topological structure that enables building low-dimensional basis for the mesh geometries. This enables the generation of deltas, as will be described below.

The geometry, or shape, of each model can then be represented using a vector that is formed by concatenating the values of all vertex positions, control points, tangent vectors, or other quantiles used to represent the model geometry. In one embodiment, the system generates one such vector for each model so that N models would result in a set of geometry vectors $g\_i$ with i being 1 . . . N. In one embodiment, the vector data for all of the vectors $g\_i$ are stored in a matrix, G, where the i'th column of G is the vector $g\_i$.

The basis vectors produced by PCA, SVD, or a similar method are denoted $b\_j$ with j being 1 . . . M where M is the number of basis vectors. The $b\_i$ can be arranged together to form a matrix, B, where the j'th column of B is the vector $b\_j$.

For each model a vector of weights, denoted $w\_i$, is then computed by solving the linear equation $g\_i=B\ w\_i$ for the unknown $w\_i$. If all the $w\_i$ are arranged as the columns of a matrix, we may write G=B W.

To create a compact representation of the geometry of a model, some of the basis vectors may be discarded creating a matrix B' and the corresponding weights discarded from W to produce matrix W'. This yields G'=B'W' where G' will approximate G more or less closely depending on which basis vectors are discarded. The computation of basis vectors using SVD, PCA, or a similar method and the selection of which basis vectors to retain is done in a fashion such that the smallest number of basis vectors is used to produce a G' and where the difference between G' and G produces a geometry error on the resulting surface less than a specified threshold. In one embodiment, the specified threshold is based on the Hausdorff distance between the two geometries, but other measures of geometric similarity may also be used. In one embodiment, the specified threshold is simply the numerical difference between G and G', but other measures of matrix similarity may also be used. The columns of W' are vectors denoted $w'\_i$. The vectors $w'\_i$ are a compact encoding of the geometry for the corresponding model. The basis vectors may optionally be ordered based on spatial frequency content such that low-frequency vectors and their corresponding weights are ordered before higher frequency ones. Using this arrangement enables the system to rapidly download a model for presentation because a low-resolution models do not require the high-frequency bases for proper display. Thus in one embodiment, the low-resolution meshes and low-frequency bases are initially transmitted to the user's device for viewing. Transmission of the higher resolution deltas and higher-frequency bases continues in the background allowing the view to be progressively refined.

In one embodiment, this approach enables the system to rapidly download models modifications, for models which share a common topology. For such models, the difference between the original and the new model may be represented by a set of delta vectors. Because these vectors have zero values for elements which are identical in the original model and the updated model the amount of data transferred is significantly reduced if the models share a significant number of features. Such vectors may also be compressed, reducing refresh time and bandwidth use.

As a user varies one of the body, garment, or pose parameters, when viewing the garment model, the difference based compact encoding is used to produce a garment geometry that corresponds to the body and pose specified by the parameters. By utilizing the difference based compact representation, the user's system can download and display the data quickly, even in bandwidth constrained systems such as mobile devices.

Figures 6A, 6B:
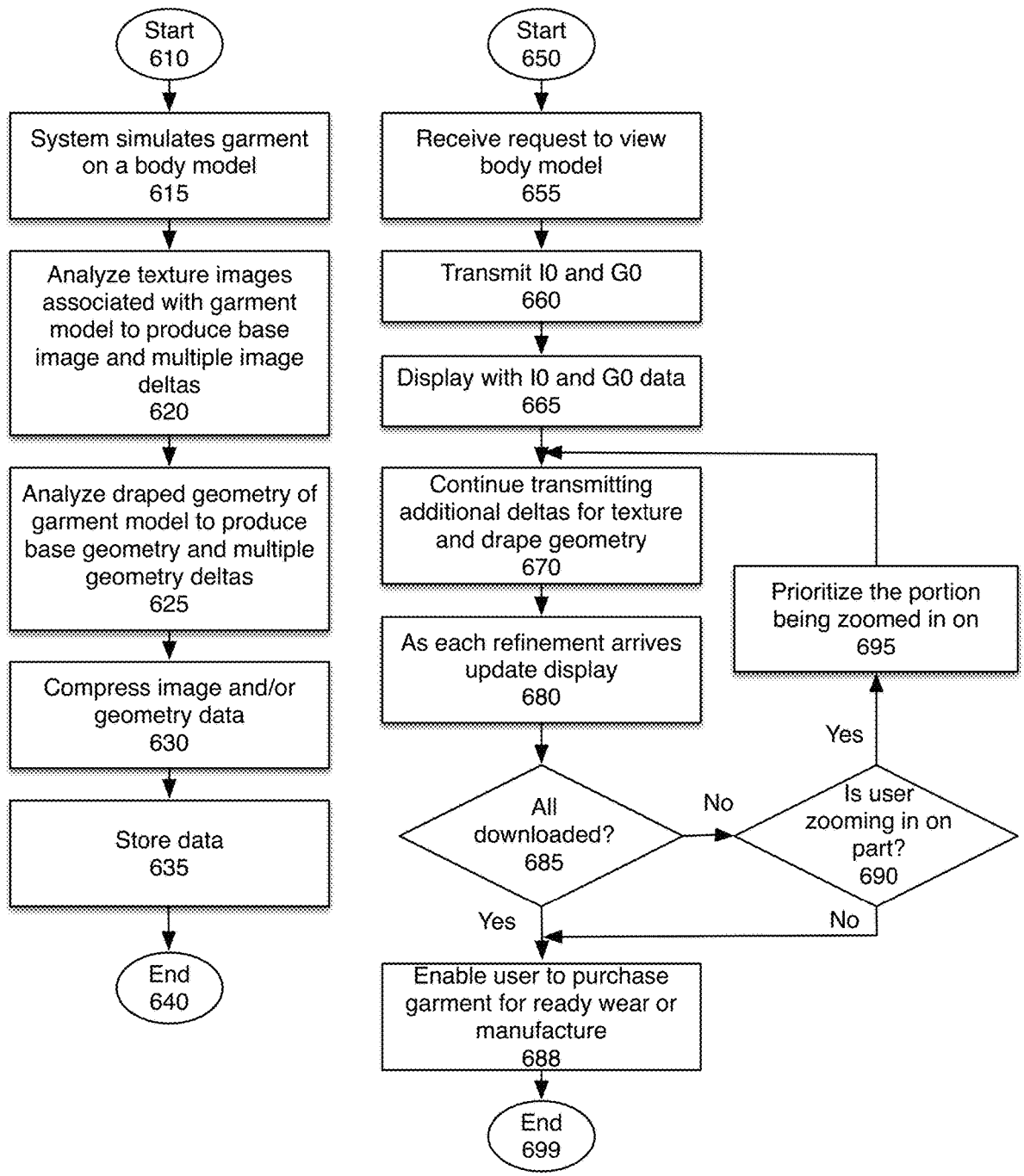
FIG. 6A is a flowchart of one embodiment of generating multi-resolution texture and drape.
FIG. 6B is a flowchart of one embodiment of displaying a garment taking advantage of the multi-resolution texture and drape data.

FIG. 6A is a flowchart of one embodiment of generating multi-resolution texture and drape.

The process starts at block 610. At block 615, the system simulates the drape of a garment model on a body model.

At block 620, in one embodiment, the system analyses the texture images associated with the garment model. In one embodiment, this is done using a technique such as Laplacian Pyramids, wavelets, or similar method that will produce a set of images I0, D1, D2, D3 . . . DN, where I0 is a low-resolution version of the original image, and D1 is the delta that must be added to I0 to produce a higher resolution image I1, D2 is the delta added to I1 to produce I2, and so forth. The N-th iteration, IN, is the original image or a close approximation thereof.

At block 625, in one embodiment, the system analyzes the draped geometry associated with the garment model. In one embodiment, this is done using a technique such as Progressive Meshes, wavelets, or similar method that will produce a set of geometries G0, R1, R2, R3 . . . RN, where G0 is a low-resolution version of the original image, and R1 is the refinement that must be applied to G0 to produce a higher resolution geometry G1, R2 is the refinement applied to G1 to produce G2, and so forth. The N-th iteration, GN, is the original geometry or a close approximation.

At block 630, in one embodiment, the image and geometry data are compressed. The process then stores the data, at block 635, and ends at block 640. While this process illustrates both texture and geometry processing, in one embodiment the system may include neither, one, or both of these features. If a parameterized smart garment is used, in one embodiment the texture and geometry processing is applied to each part of the compact encoding. The transmission of G0 for each part of the compact encoding is transmitted, then each R1, R2, . . . RN is transmitted. If the garment has a set of parameters indicating that some parts of the compact encoding have more significance than others, then refinements corresponding to those significant components will be prioritized. As discussed above, prioritization may be based on frequency content, but other heuristics may also be used. For example, for a garment with pleats, the pleat geometry may be prioritized over the geometry of a collar. This prioritization allows the specified error measure between the result viewed on the user's device and the reference stored on the server to be reduced as quickly as possible.

FIG. 6B is a flowchart of one embodiment of displaying a garment taking advantage of the multi-resolution texture and drape data. The process starts at block 650.

At block 655, a request to view a garment model is received.

At block 660, the system will initially transmit I0 and G0 so that viewing may begin quickly. Because these files are relatively small, the response time of the system is very fast.

At block 665, the display will show the garment, with the I0 and G0 data. At block 670, the system will continue to transmit D1 . . . DN and R1 . . . RN in the background as the user views the models. At block 680, the data additionally downloaded data is used to progressively improve the results viewed by the user until the data is fully downloaded.

At block 685, the process determines whether the download of the entire data set is complete. If so, the process continues to block 688. At block 688, the system enables the user to purchase the garment being displayed. In one embodiment, a user interface providing a purchase option is provided. In one embodiment, once a garment is purchased, the system may pass the garment data to manufacturing, to enable on-demand manufacturing of garments that are customized to the user. The process then ends at block 699.

If at block 685 the system found that not all of the data was downloaded, the process continues to block 690.

At block 690, the process determines whether the user has chosen to view a part of the model closely. If so, at block 695, data corresponding to that part will be prioritized. The process then returns to block 670 to continue receiving additional details and refining the display.

Figure 7:
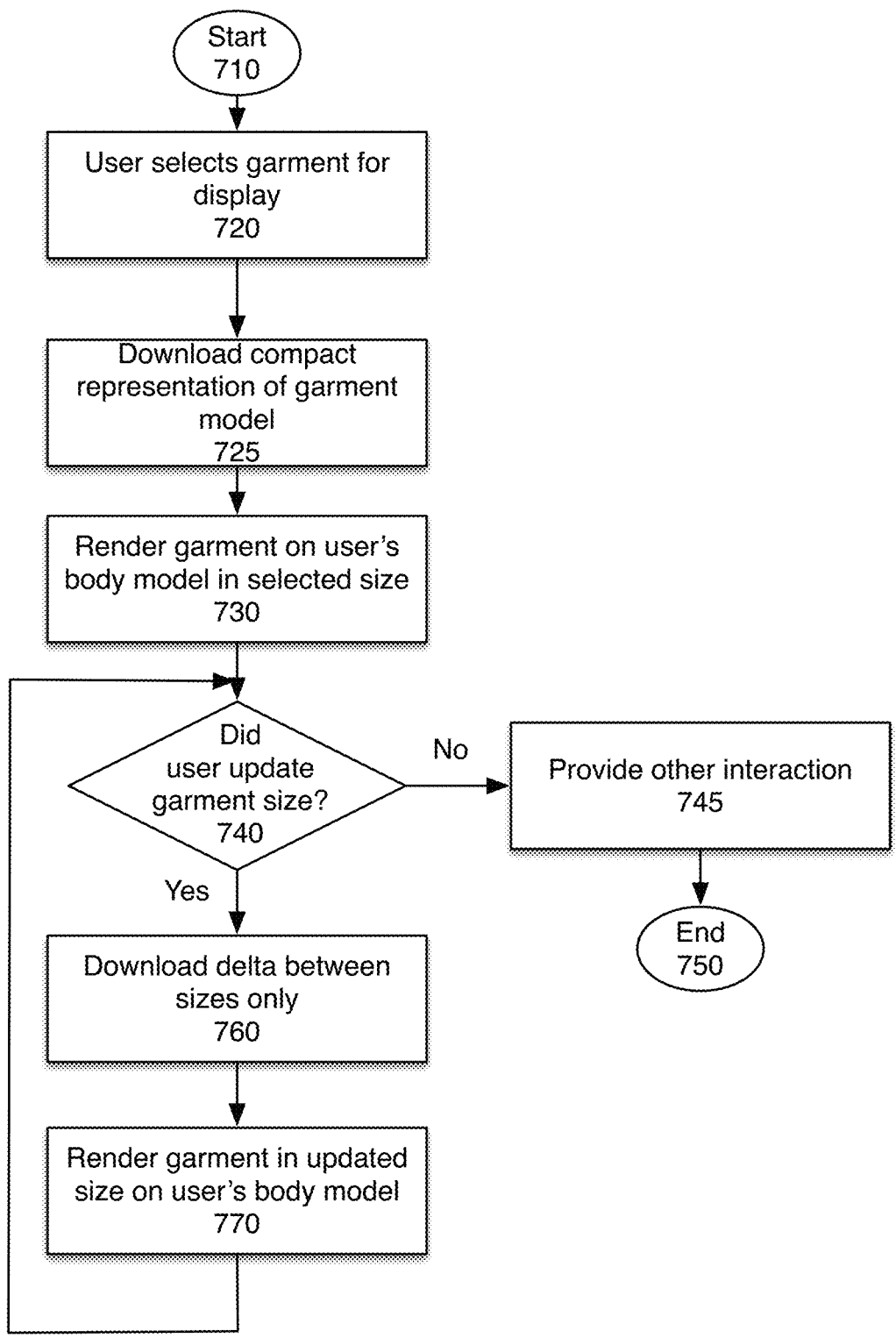
FIG. 7 is a flowchart of one embodiment of adjusting a garment size in a display.

FIG. 7 is a flowchart of one embodiment of adjusting a garment size in a display. The process starts at block 710. At block 720, the user selects a garment for display.

At block 725, the compact representation of the garment is downloaded to the user's device. As noted above with respect to FIGS. 6A and 6B, this may be done iteratively.

At block 730, the garment is rendered on the user's body model in the selected size.

At block 740, the process determines whether the user updated the garment size. If not, other interaction is provided via the system, as described elsewhere, and the process ends. If the user updated the garment size, the process continues to block 760.

At block 760, the delta between the sizes is downloaded. The delta between the garment sizes may be represented as a vector of displacements that is applied to each vertex of the clothing model such that the displacement at each vertex will move it from the location specified in the first size to the location specified in the second size. The displacements may be represented compactly, for example using quantization or a reduced number of bits for encoding. The delta may also be represented using coefficients of a low-dimensional encoding such as the one produced by PCA or a similar method.

Figure 8:
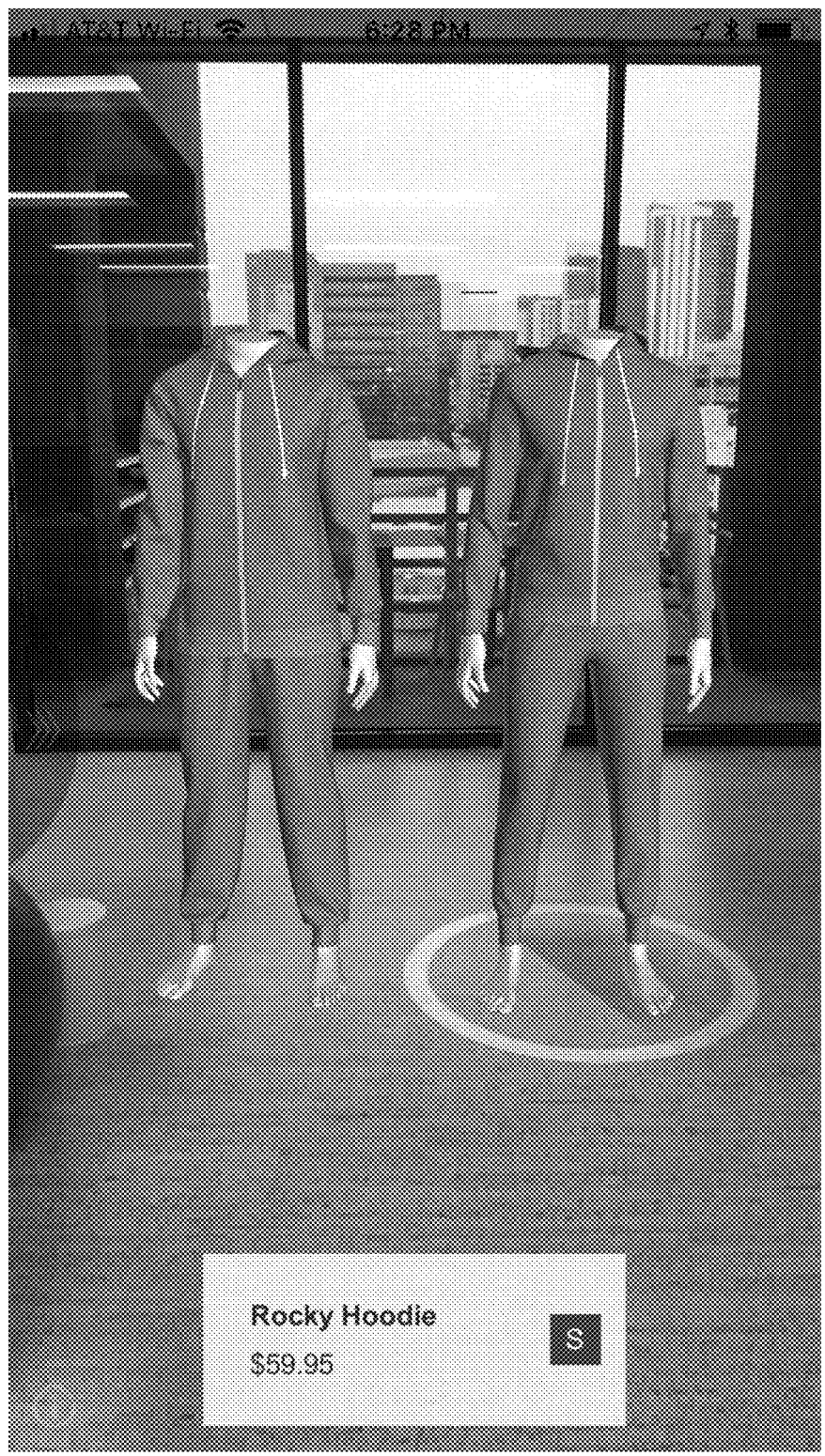
FIG. 8 illustrates the appearance of the body model with two different sizes of the same garment.

At block 770, the updated size is rendered on the user's body model. In one embodiment, the updated size is rendered next to the original size, as shown in FIG. 8. In one embodiment, the user may choose to display only the new size or both sizes. The process then returns to block 740.

In one embodiment, this process may be pro-active and the system may automatically download the delta for the adjacent sizes, after the download of a selected size is complete. Thus, the system may trigger the download of the additional size delta without a user request. In one embodiment, this process may be based on analysis of the user's interactions. In such a case, the additionally sized garments are downloaded if the user has indicated an interest in such sizes in the past. In one embodiment, this process may be based on analysis of the garment selected for display. If the originally rendered image appears to be too tight, or too loose, the system may proactively trigger the download of the next larger/smaller size. In one embodiment, the user may set preferences for pro-active downloading. In one embodiment, whether or not the additional size data is downloaded may be based on a combination of such factors.

FIG. 8 illustrates an exemplary display showing the appearance of the body model with two different sizes of the same garment. In this example, the two body models are shown next to each other. In one embodiment, in common use the system replaces the first body model with the second body model when the size of the garment is changed. However, in one embodiment, as described in FIG. 9, the user may duplicate the body model to display the two sizes next to each other, as shown in FIG. 8.

Figure 9:
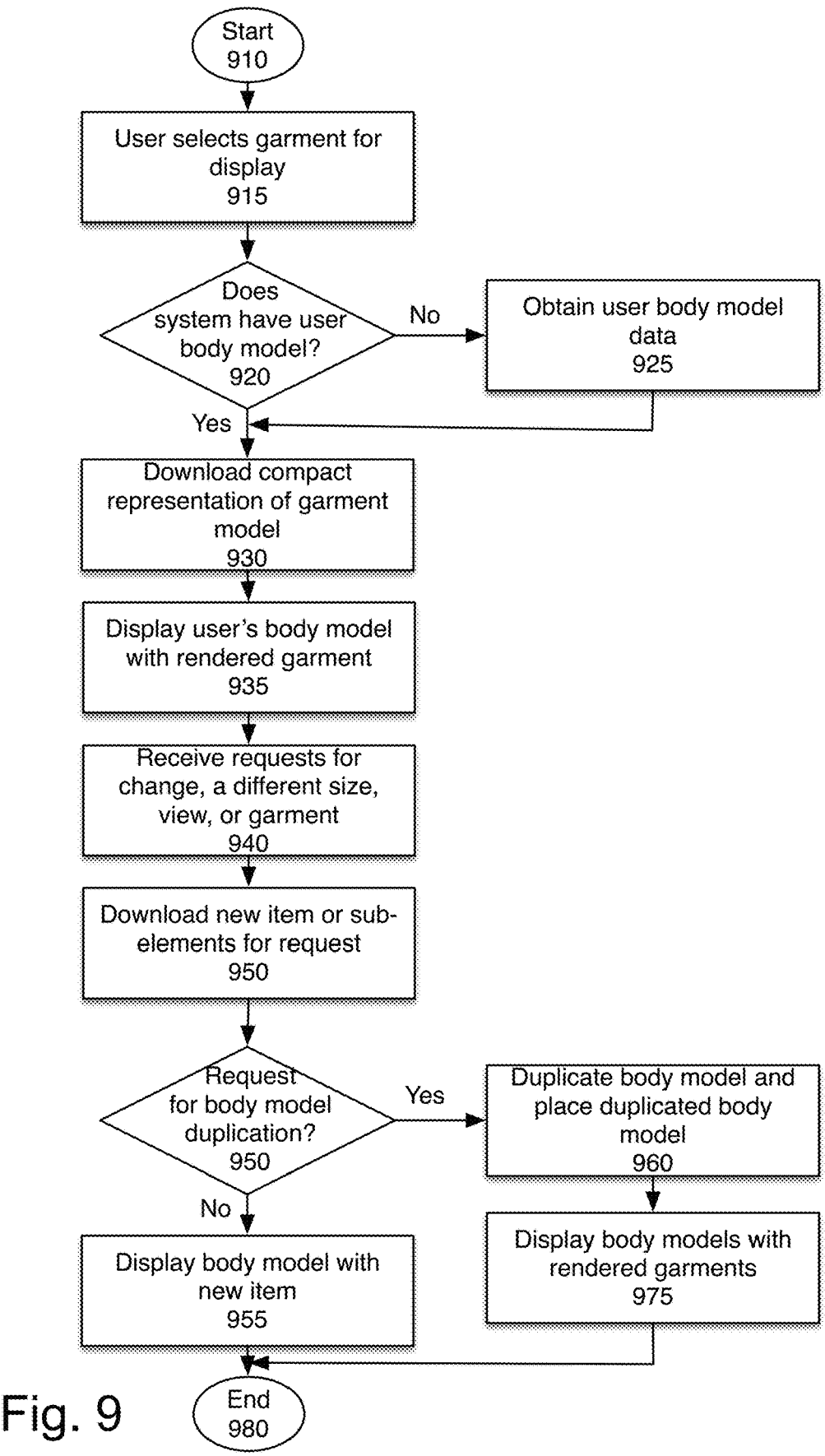
FIG. 9 is a flowchart of one embodiment of one embodiment of cloning a body model.

FIG. 9 is a flowchart of one embodiment of one embodiment of duplicating a body model. In one embodiment, cloning a body the same body shape and pose requires no new data. If the duplicated body model requested has a different pose, delta transmission is used to send the small amount of data representing the delta. Note that a different view (e.g. front v. back v. side) is not considered a different pose, since the body model data transmitted provides 360-degree perspective on the body, so the user can walk around the body model. The process starts at block 910.

At block 920, the process determines whether the system has the user's body model. If not, the user's body model is obtained, at block 925. In one embodiment, this may be done in various ways, including the use of a camera, measurements, special purpose devices, etc. Some of the methods described in the Rendering Application may be used. The process then continues to block 930. If the user's body model is already in the system, the process continues directly to block 930.

At block 930, the compact representation of the garment is downloaded, and at block 935 the rendered garment is displayed on the user's body model.

At block 940, the system requests a different size, view or garment. Note that a different angle (e.g. front v. back v. side) of the same body model in the same garment is not considered a different view, since the body model data transmitted provides 360 degree perspective on the body However, cloning may be used to enable the display of the same garment from both sides simultaneously, as shown in FIG. 10B.

At block 950, the new item or sub-elements are downloaded. At block 950, the process determines whether the user requested cloning. Cloning enables the display of two or more body models next to each other with a change in the size, view, or garment. This allows a visual comparison that is very useful.

If no cloning was requested, the body model is re-rendered with the requested change. The process then ends at block 980.

If cloning was requested, at block 960, the body model is duplicated. In one embodiment, the duplicated body model may be identical to the original, in which case no additional data is downloaded or needed. In another embodiment, the original body model and the duplicated body model may differ in pose or size. For example, the user may wish to view how the garment would lay when in presentation pose, or seated pose in addition to the default pose. This enables the user to view the body model in various poses that they may take while wearing the garment. As another example, the user may wish to view how the garment would look when the user lost some weight, or gained some weight, or muscle tone. Thus, the duplicated body model may be adjusted in weight or pose or other parameters. The duplicated body model may be positioned next to the existing body model. In another embodiment, the duplicated body model may replace the original body model, leading to only one body model being displayed, but with a different size or pose.

At block 975, the garment is displayed on the new body model. As noted above, the garment rendering may utilize the elements previously. In one embodiment, the rendering of the garments for the various poses and body model sizes is done on a cloud system, prior to making the garments available to users. Thus in one embodiment while the body model is duplicated and positioned, the rendering obtains the completed duplicated body model and garment rendered in the cloud for display on the user's device. As noted above, for changes to the body model pose and garment size, only the delta is downloaded to complete rendering.

Figure 10A:
FIGS. 10A and 10B show exemplary displays with duplicated body models.
Figure 10B:
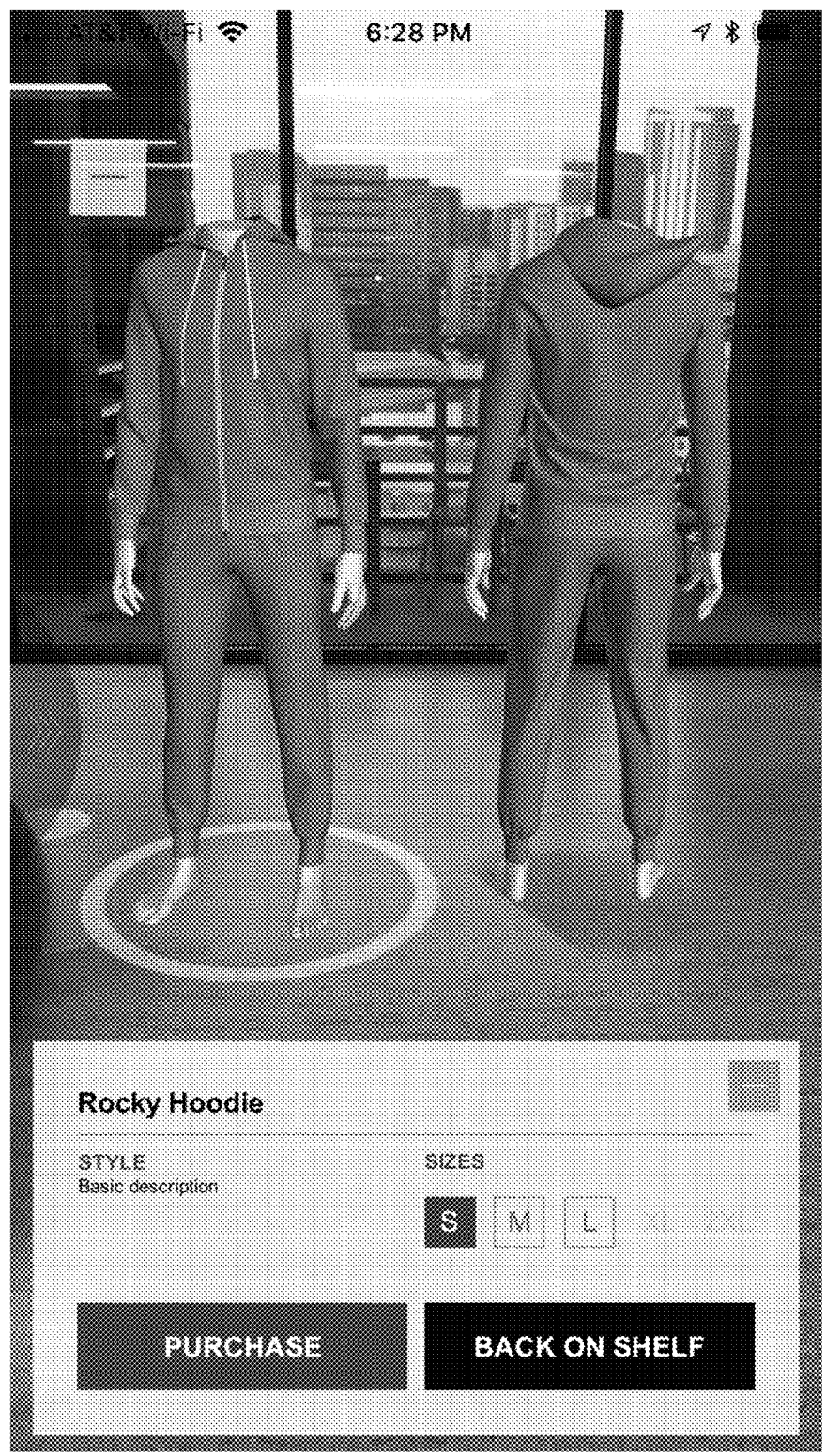

FIG. 10A show an exemplary display with a duplicated body model so that the user can see two different clothing items next to each other. This is particularly useful when comparing similar clothing items. In one embodiment, this may also be used in putting together "outfits" rather than individual items of clothing. For example, the user may place side-by-side two body models wearing the same slacks, with a different blouse or jacket.

FIG. 10B illustrates an exemplary display with a duplicated body model so the user can see the front and back of the same item of clothing at the same time. As noted above, the user can "walk around" a display to see all sides. However, some users may prefer to be able to see the front and back simultaneously.

Figure 11:
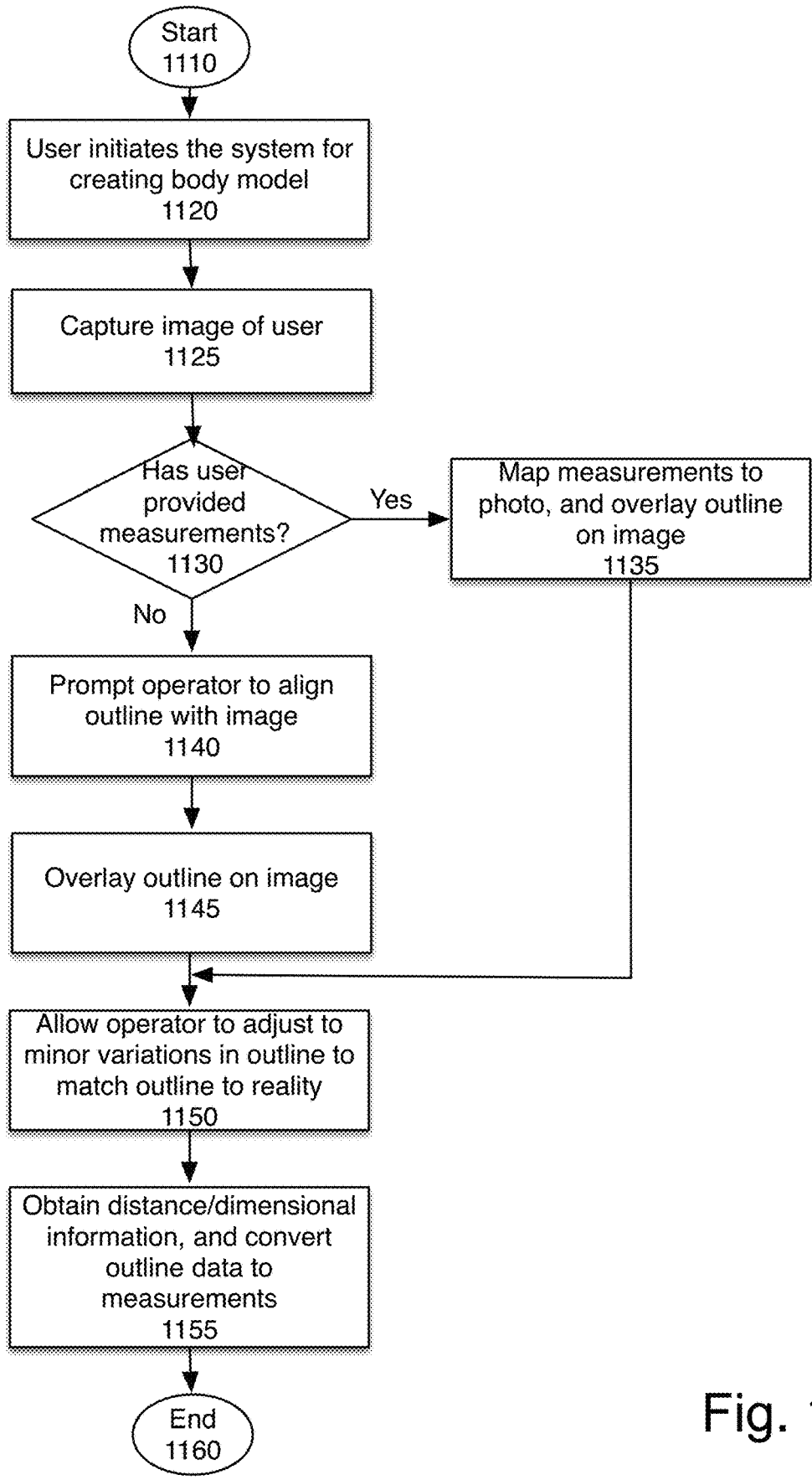
FIG. 11 is a flowchart of one embodiment of customizing a body shape, utilizing a visual user interface.

FIG. 11 is a flowchart of one embodiment of customizing a body shape, utilizing a visual user interface. The process starts at block 1110. At block 1120 the user initiates the system for creating a body model.

At block 1125, the system captures an image of the user. In a preferred embodiment, this process involves two people, the user whose body model is created, and the operator who is using the device to create the body model. Alternatively, the user may use a mirror to both operate device and be the subject. In another embodiment, the user may place the device on a table, tripod, or otherwise arrange for it to be held in place while the user positions him/herself in the device's viewing area. A timer, remote, or voice command would be used to trigger capture of an image with depth information. Once captured the user could pick up the device and adjust the outline to the captured image. Yet another alternative would be to have a user use two devices so that one device is viewing the user and the user hold the second device and uses it to remotely operate the first device.

At block 1130, the process determines whether the user has provided measurements. If so, at block 1135, the measurements are mapped to overlay the outline on the user's image. The process then continues directly to block 1150.

If the user has not provided measurements, the process continues to block 1140. At block 1140, the operator is prompted to align an outline with the captured image of the user. In one embodiment, prior to asking the user to adjust the shape, the system uses edge detection to find contours of the body. The system can then "snap" the basic outline to the detected contours. In one embodiment, this feature may be optionally enabled by the user.

In one embodiment, the outline shape changes both height and width at various points as the user manipulates the outline. In one embodiment, sliders are used. For example, the height slider makes the outline taller, and the shoulder slider makes the outline have broader/narrower shoulders. In one embodiment, these changes are based on body data. This means that changing height could be more intelligent than just scaling the height. It might also lengthen the arms or make the hips slightly wider, based on data about how human bodies are shaped. In one embodiment, instead of sliders, other user interface widgets could be used. In another embodiment, the body outline could be manipulated directly and a method such as inverse kinematics could be used to map the desired outline change to a corresponding change in parameters.

At block 1145, the outline is overlaid on the image. Because of the adjustments, the outline should match the position and shape of the user's captured image closely.

At block 1150, the system allows the operator to adjust variations in the outline to match the outline to reality. In one embodiment, in addition to being able to do this facing the user, the operator is able to do this from multiple angles, for example from the back and or the side. This enables the mapping of the user's body closely.

At block 1155, the distance/dimensional information is obtained, and the outline data is converted to measurements for the body shape associated with the user. In one embodiment, distance to the subject in the image is computed using the mobile device's IR depth sensor, depth camera, stereo camera pair, or similar device that allows acquiring distance information. This data is then stored, and the process ends at block 1160. In this way, the system can map the user's body utilizing an interactive process and a simple mobile device rather than requiring a multi-camera capture booth or similar system.

Figure 12B:
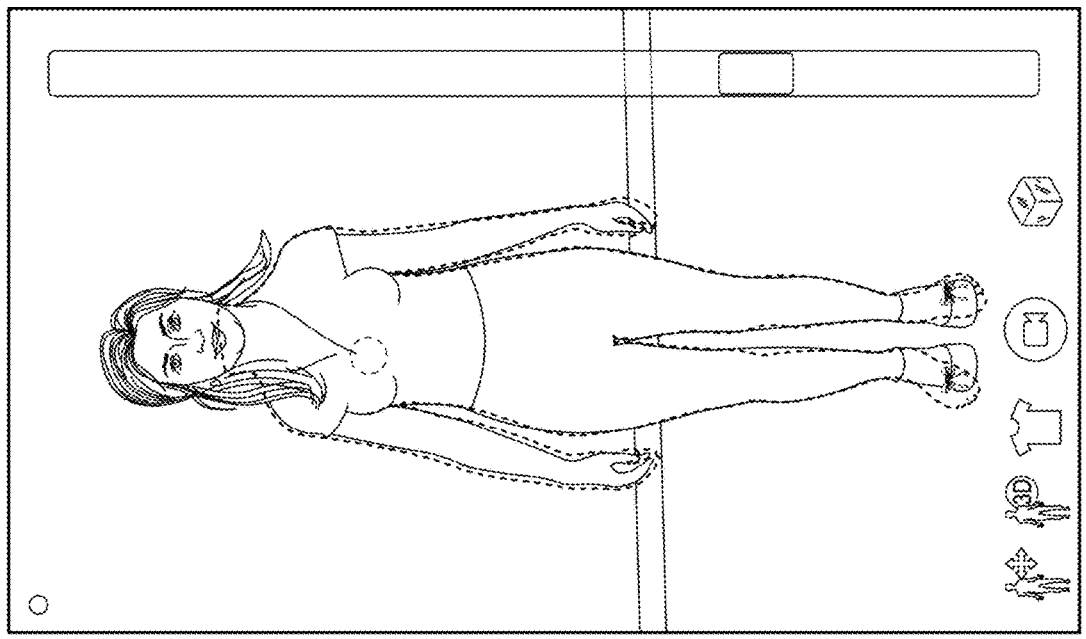
FIG. 12A-12B illustrate some exemplary adjustments using the customization tool.
Figure 12A:
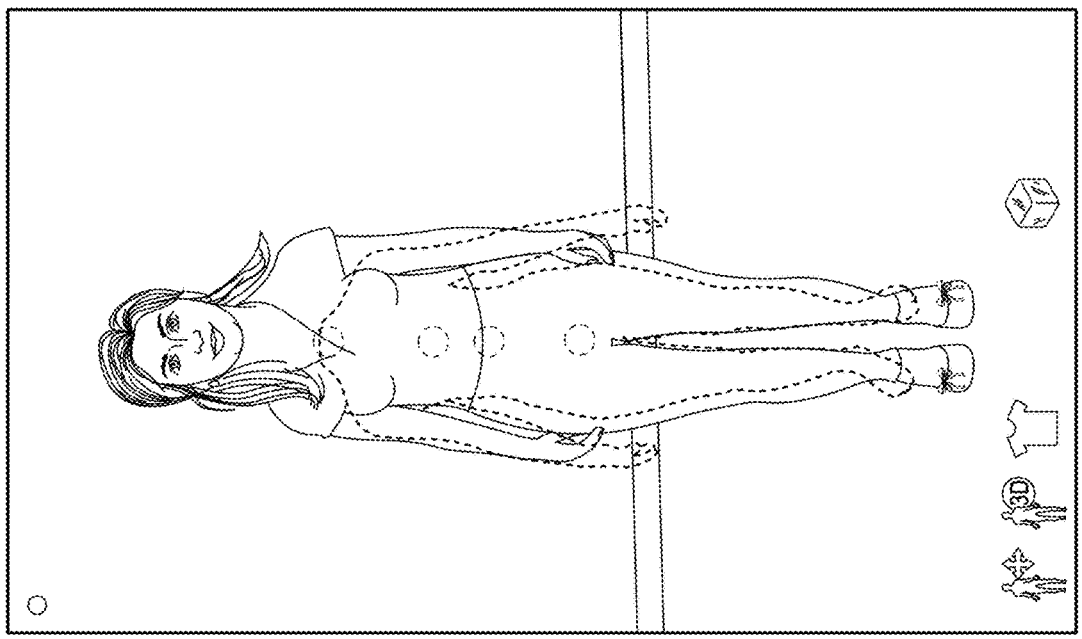

FIG. 12A-12B illustrate some exemplary adjustments using the customization tool. As can be seen, the shape outline initially is not aligned with the user's image. The user may utilize a slider or similar tool, in one embodiment, to approximately align the body shape with the user's actual body. In another embodiment, the system may automatically adjust to the camera image, as shown in FIG. 12B. In one embodiment, the user may then use controls to further adjust the outline to more closely match the user's proportions. In one embodiment, this adjustment may be recommended from multiple views, e.g. from the front as shown, from the side, and from the back. In one embodiment, the system may also request a measurement (for example a waist measurement) which may be used to determine the size correspondence for the image.

Figure 13:
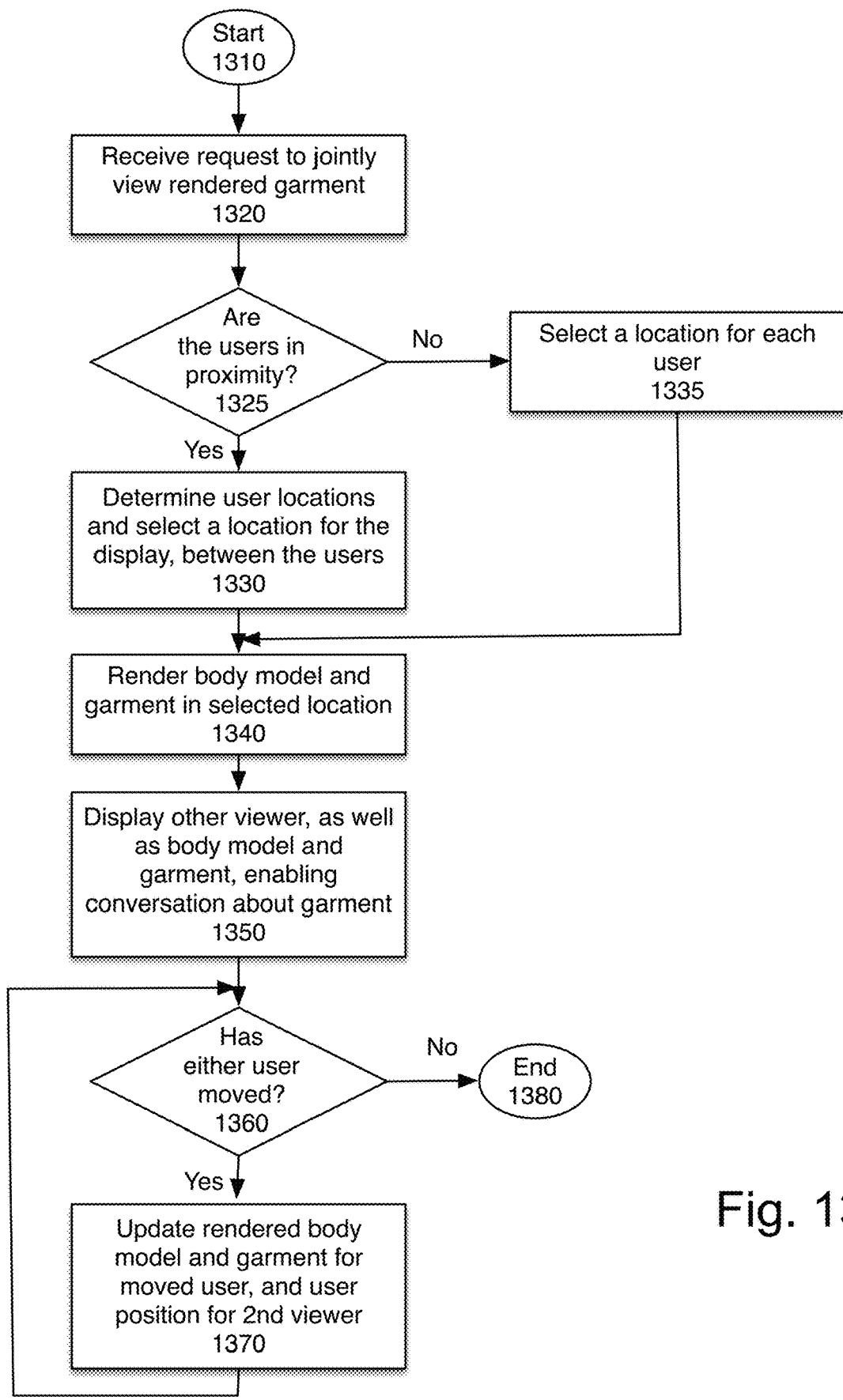
FIG. 13 is a flowchart of one embodiment of viewing the same scene with multiple devices.

FIG. 13 is a flowchart of one embodiment of viewing the same scene with multiple devices. The process starts at block 1310. In one embodiment, this scenario may be used by two or more users in close proximity to view the garment simultaneously. In one embodiment, this scenario may be used by two or more users are in different locations.

At block 1320, the system receives a request to jointly view a rendered garment from two or more user devices. In one embodiment, a first user initiates the view, and may authorize a second viewer to share the view. The second or later viewer may then accept the shared view. In another embodiment, when two or more connected users request to see the same garment at approximately the same time, they are prompted to indicate whether they wish to share the view. If all users indicate they wish to share the process is initiated. In one embodiment, there may be a "initiate shared view" tool, which permits a user to select one or more other users to share a view with. Other ways of initiating a shared view process may be used.

At block 1325, the process determines whether the users are in close proximity. Two or more users in close proximity can share a view. Also, two or more users who are removed from each other can share a view in order to work together. Some examples of when this feature may be useful is in allowing designers to work together, a designer and manufacturer to review a design together, or for two users to share an experience. In these, and many other scenarios, multiple users may want to interact jointly with a garment, while being in separate locations. This enables, for example, a user to share their impression of a garment with a one or more friends, coworkers, or other users.

If the users are in close proximity, at block 1330, the relative location of both users is identified, and a location is selected for the display. In one embodiment, a location between the users is selected. In one embodiment, if the users are not sufficiently proximate the system may inform the users to move closer together. If the users are very close in position, the system may select a location in front of both users. If the users are not in proximity, separate locations in front of each user are selected, at block 1335. In one embodiment, if the users are in close proximity the devices may communicate directly via of Bluetooth, WiFi, or other networking technology.

At block 1340, the body model and garment are rendered in the appropriate position or positions. In one embodiment, the system first selects a position for the image, and then determines the angle and distance to that position from the user's individual device. The rendering is then adjusted based on that position. In one embodiment, the position data may be absolute position data, such as GPS or network triangulation based data. In one embodiment, the relative positioning of the devices may also utilize peer-to-peer communication between the devices when users are in close proximity.

At block 1350, the system displays a representation of the other user and the garment simultaneously, enabling conversation about the garment. In one embodiment, when the users are remote from each other, a simplified avatar or representation of the other person may be used. In one embodiment, the visual representation may include an outline, and a representation of a pointer or other indicator of where the user is pointing. In one embodiment, this data may be obtained from a separate camera, a sensor such as a ring or motion sensor, or another element which is able to determine the user's body position. In one embodiment, the body of the user may be represented by a simple line drawing, with the "communication" element being through a finger or pointer. In another embodiment, the other user may be simply represented by a pointer such as a hand or arrow. Other ways of representing the user may be used. When the users are in close proximity, in one embodiment, the augmented reality feature may be used to provide a camera-view image or direct optical view of the other user.

Because both users may move around while the display is active, at block 1360 the system determines whether either viewer has moved. If not, the process ends when the users terminate the session. Until then, the system continues to monitor for motion.

If a user moves, both displays are updated. In one embodiment, the moving user's display is updated to correspond to the adjusted location of the user. The other user's display is updated with the new position of the moving user. In this way, two users may have a conversation about a garment, as they interact with it in the virtual world. Because this feature enables showing the other user as well as the garment and the other user's interaction with the garment, the users can have a natural interaction, discussing various features and views of the garment. This may be useful for example when trying on bridal gowns or other complex garments. It may also be useful in designing garments. For example, in one embodiment, the designer and the manufacturer may jointly review the garment design, in various sizes, prior to the garment being made. This is very useful to catch for example upsizing and downsizing issues in the design.

Figure 14A:
FIG. 14A-14G illustrate some exemplary viewing configurations for two users.
Figure 14B:
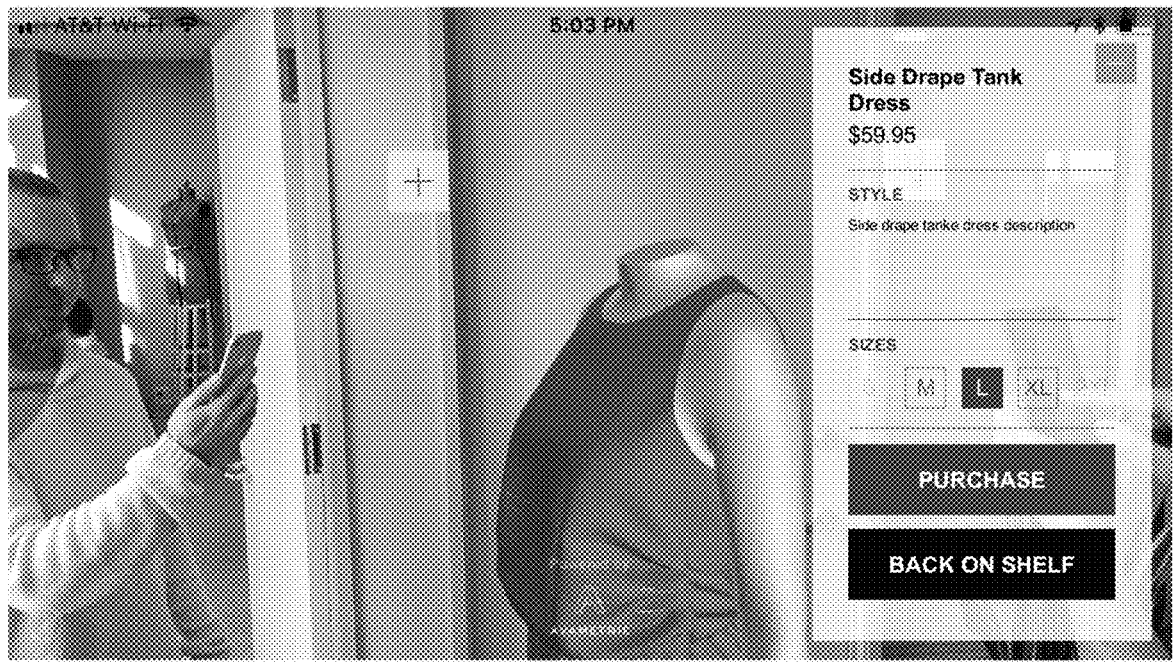
Figure 14C:
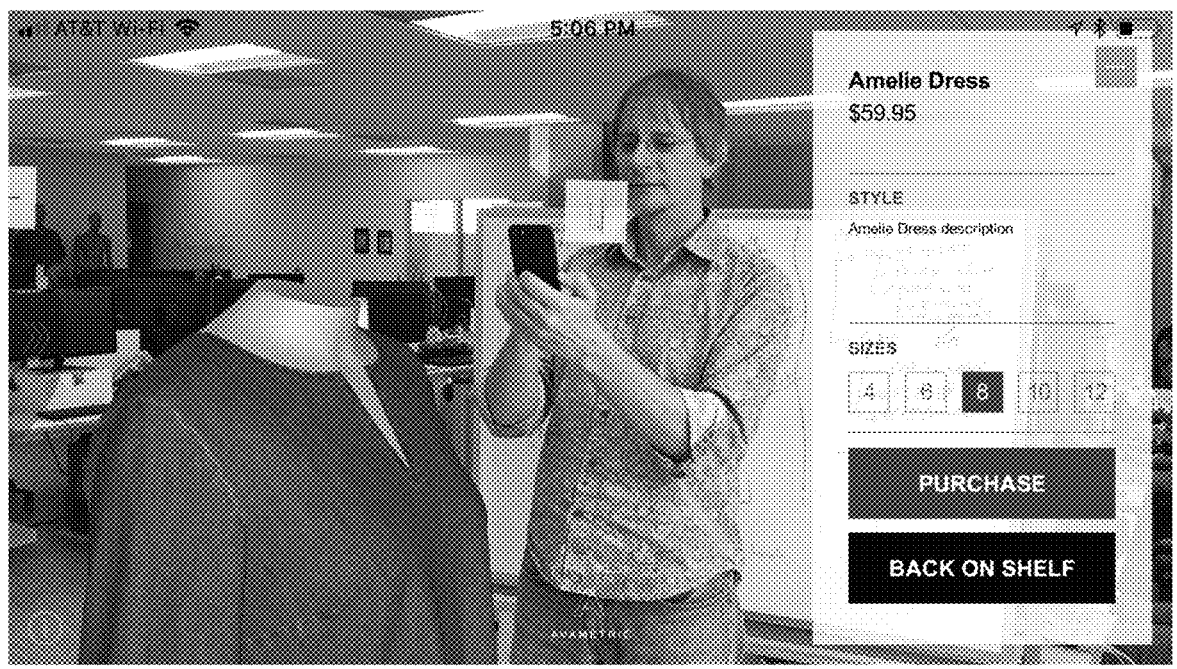
Figure 14D:
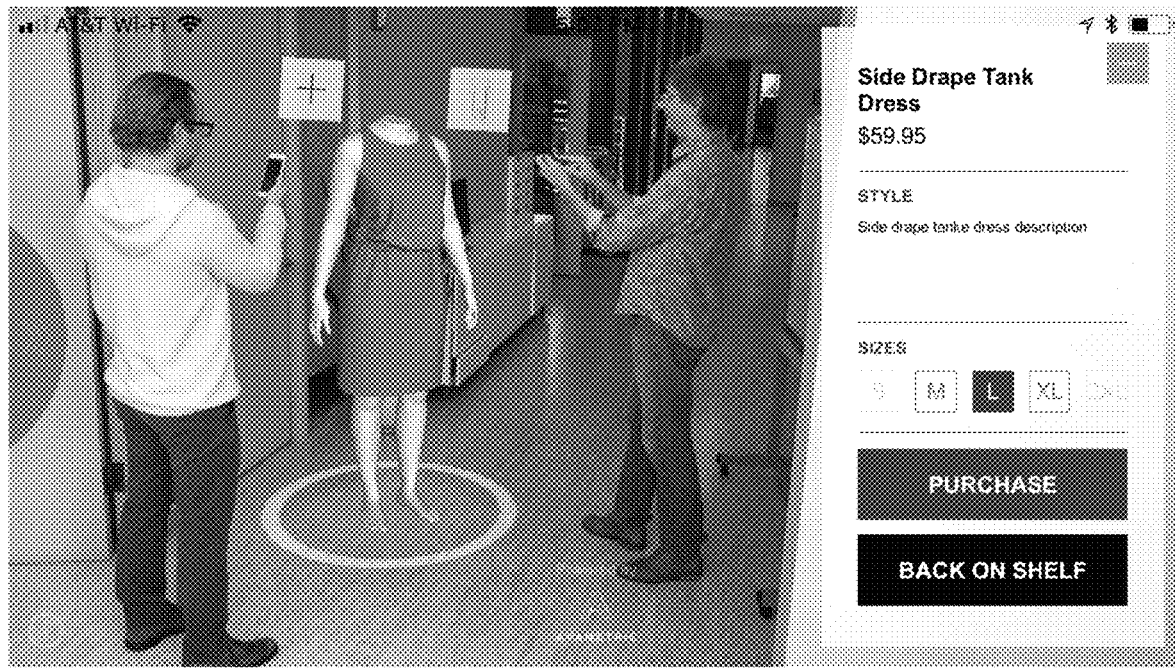
Figure 14E:

FIG. 14A-14F illustrate some exemplary viewing configurations for two users. Note that while the illustrations show viewing with a mobile phone, users may of course use head-worn devices such as AR goggles and the like to perform these actions. FIG. 14A shows the "real world" image. The rendered garment model is present, but not visible, outside the AR system. FIGS. 14B and 14C show the appearance of the scene to the two participants. Each participant sees the relevant garment model, and the other person participating. This enables the two participants to interact and discuss the garment model, for example pointing to specific elements within the garment model. FIGS. 14D and 14E show a composite image showing the rendered garment model and the two participants. This image is generally not seen by anyone, except a potential third participant who is in the shared AR space. It is being shown to explain the idea of a shared AR display.

If the users are not located near each other, then they may still view the same garment and body models. In a VR-type display they would view the models in a virtual scene. Typically, the virtual scene would be the same for all users, but different scenes could be used for each user. For AR-type displays the users would view the garment and body models in different scenes corresponding to the physical location of each user. In one embodiment, for shared views, each user would be represented virtually to the other users. In one embodiment, this may be as a virtual representation displayed to the other users. In one embodiment, the virtual representation may be an avatar, a simplified outline or display, or a pointer or other graphic elements illustrating relevant data about the user. In one embodiment, the relevant data may be a gaze direction and/or pointing location.

Figure 14F:
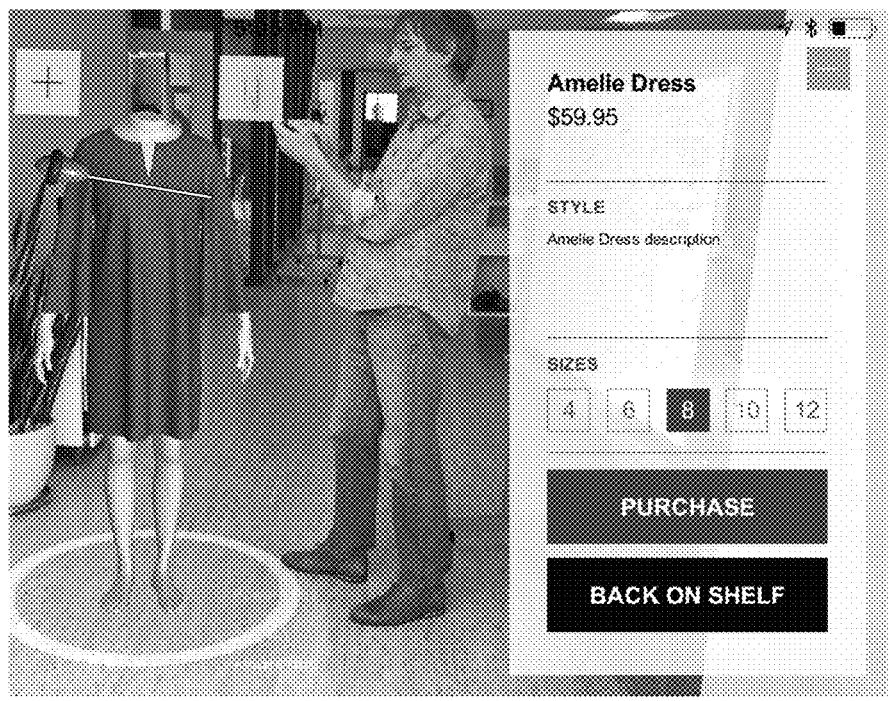
Figure 14G:

In one embodiment, the interface may be similar to the virtual reality interface provided by the HTC VIVE™ system, with a pointer, showing a line indicating where the user is focusing his or her attention. FIG. 14F illustrates one embodiment of the virtual representation of two users in shared environment, showing one user's image (augmented reality) and the other user represented as a pointer showing the area of attention. In one embodiment, the system may include two pointers for a user. In one embodiment, both users may be represented in the VR/AR space by pointers. In one embodiment, the position of one or more of the user's heads and gaze directions may be depicted using graphics elements. In one embodiment, a computer vision system, or other trackers, may be used to track the user's body and show a graphical representation of the user's body in the virtual environment. In one embodiment, the representation may be simplified. As shown in FIG. 14G in one embodiment, the user's pointer reflects a first-person perspective, and the other user's pointer is shown in a third person perspective. This enables the users to interact in the shared environment. In one embodiment, the shared environment includes the ability to converse, text, and add the tags discussed below.

Figure 15:
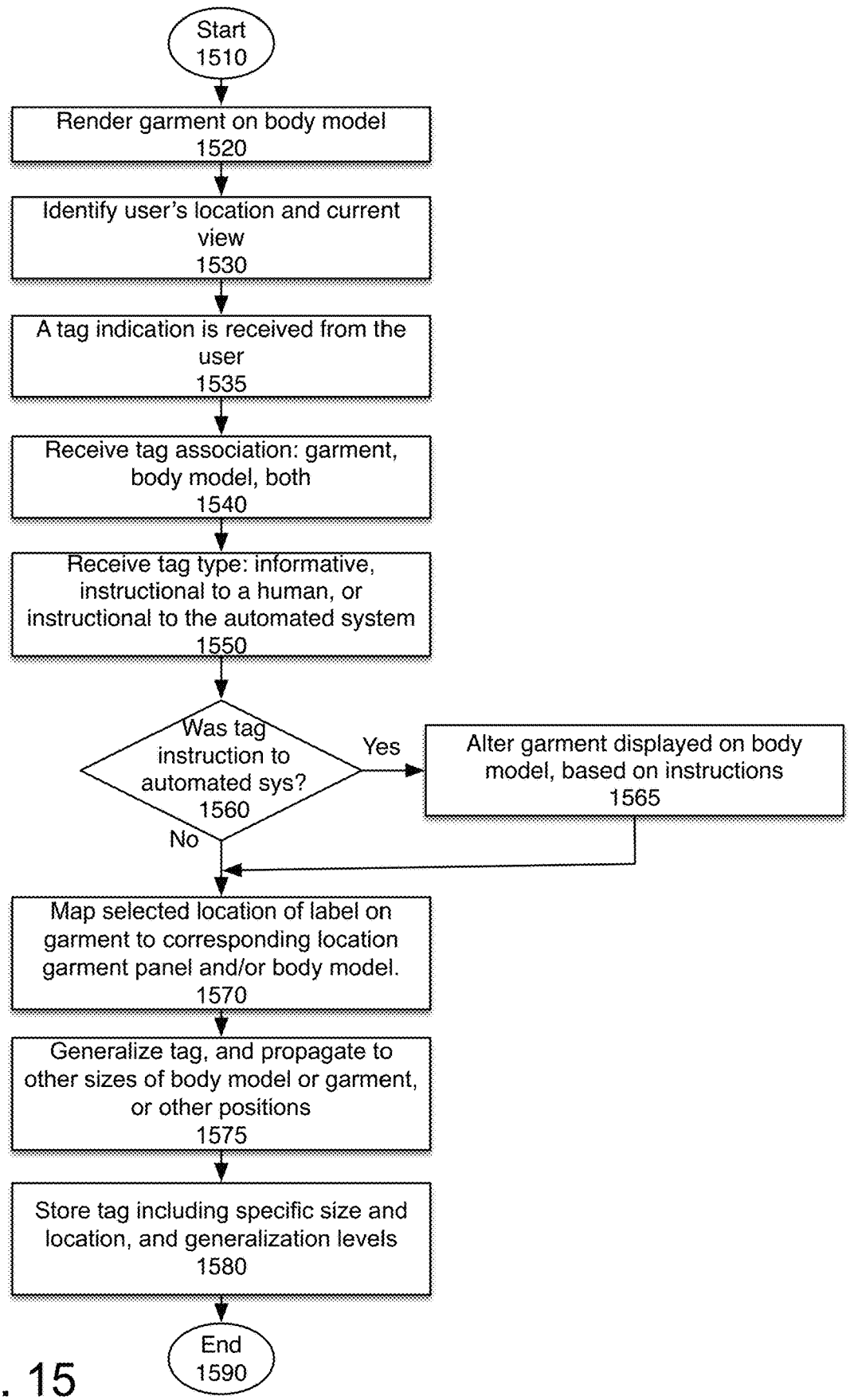
FIG. 15 is a flowchart of one embodiment of commenting on and tagging a garment.

FIG. 15 is a flowchart of one embodiment of commenting on and tagging a garment. In one embodiment this type of tagging may be used by designers or manufacturers in flagging issues with how the garment appears. In one embodiment, in creating custom or semi-custom garments, or specifying alterations or other changes, this type of tagging may be used by a potential customer, to flag concerns or request changes in the garment.

At block 1520, the garment is rendered on a body model. At block 1530, the user's location and current view are identified with respect to the rendered image. At block 1535, a tag indication is received from the user. In one embodiment, a tag indication may be received by the user making a particular gesture, or pressing a control on the mobile device, or touching the screen in a particular location and selecting "tag" as the option. The tag may be associated with the body model or the garment being shown.

At block 1540 the process determines whether the tag is associated with the garment, the body model, or both. In one embodiment, a tag may be associated with a garment, indicating a particular portion of the garment (e.g. neckline seam should be straight). In one embodiment, the tag is associated with the body model, indicating a location on the body model for information (e.g. a tag on the elbow may indicate that the sleeve should reach elbow). In one embodiment, the tag is associated with the garment and the body model (e.g., certain portion of the garment and the body model are to be aligned).

At block 1550, the tag type is identified. The tag type may be informative, instructional to a human, or instructional to an automatic process. An informative tag may indicate that a particular feature works well or is aligned in a certain way. For example, a tag may indicate that the sleeves are elbow length, tagging the body model elbow. This enables the elbow-length aspect to be propagated as the body model changes, and the arms and shoulder shapes change.

A tag may be instructional to a human designer or manufacturer. In this context, this means that the tag is used to instruct someone to make an alteration. Of course, with automated manufacturing machines, the human designer or manufacturer may use the instructional tag to make a change in a machine or system.

A tag may be instructional to an automated system. In one embodiment, certain alterations may be made automatically. For example, if a user selects the knee of a pair of jeans, and indicates that it should be reinforced, the system may in one embodiment replace the fabric there with a thicker/sturdier fabric, or add an additional layer of fabric. In one embodiment, such automation is available when the user selects an entire panel, but not for partial panels. Similarly, if a particular panel is selected and a tag is added to alter the fabric color, this change may be made automatically. Other automatic change may include a button or zipper type, fabric type, fabric color, etc. In one embodiment, simple substitutions and additions may be automated.

At block 1560, the process determines whether the tag was instructional to the automated system. If so, at block 1565, in one embodiment, the depiction of the garment is updated based on the tag. The process then continues to block 1570. If the tag was not instructions to the automated system, the process continues directly to block 1570.

At block 1570, the selected location for the tag is mapped onto the corresponding garment panel location and/or body model location. In one embodiment, if an AR/VR headset or similar display mechanism is used, the user may "touch" the virtual clothing item in a particular location in the virtual display. In one embodiment, the user may touch the screen at the location for the tag.

Optionally, at block 1575 the tag may be mapped to garments and/or body models of different sizes, proportions, or design variations. In one embodiment, the user may indicate whether to map the tag. In one embodiment, the tag may be specific to the particular garment size, body model, and/or body model pose. For example, a designer (or user) may find that a particular garment's arm hole is too high in one size, while it is normal in other sizes. In that instance, the tag is not generalized but rather associated with the particular size being evaluated. In contrast, a designer (or user) may find that a seam in all sizes of a particular garment is twisted or otherwise problematic. In that instance, the tag should be generalized. In one embodiment, the user placing the tag may generalize based on one or more of: body model (e.g. the issue occurs regardless of which body model it is), pose (e.g. the issue is not pose-specific), garment size. In one embodiment, the system may enable the user to generalize across multiple designs as well. For example, in one embodiment, the system may enable the user to generalize tag to a particular style, not just to variations in size. For example, the user may determine that a particular style of garment such as a V-necked blouse from a particular designer, always has too deep a V-neck for size XS models. This tag may then be generalized across multiple designs for different items of clothing, while staying with a particular garment size.

At block 1590, the process generates and stores the tag, which includes the associated garment location and/or body model location, tag type, user data, specific data for the body model size and position, and garment item size and tagging location. The tag further includes which aspects of the tag are generalized, and across what range, in one embodiment. For example, the tag may apply to clothing items of sizes XL and XXL but not smaller sizes. The tag may apply to clothing in the arms akimbo pose only, and so on. The tag is then stored at block 1575. In one embodiment, other users may comment on tags, or modify tags.

In one embodiment, tags may have a status. In one embodiment, the status may be "active" (needing to be addressed), "informational" (no action needed) or "resolved" (tag successfully addressed). For example, a designer may communicate with the manufacturer using tags, and the design and modification process may be stored in the associated tags.

The use of such tags enables a designer to interact with the garment without requiring a visit to the factory floor. By enabling tagging of a garment, both bulk manufacturing and customization is simplified.

Figure 16:
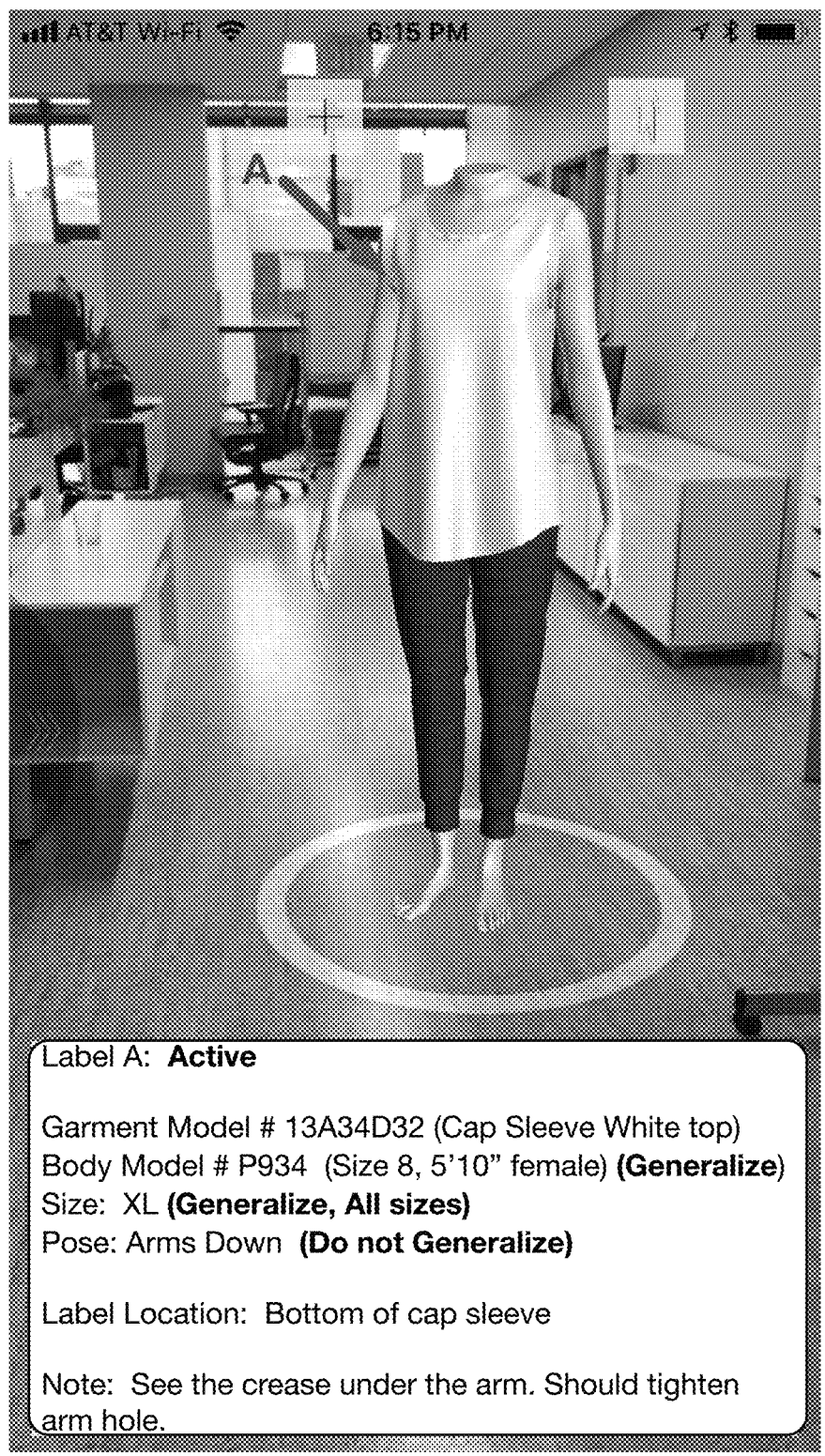
FIG. 16 is an exemplary image showing the tagging feature.

FIG. 16 is an exemplary image showing the tagging feature. In one embodiment, the tag is labeled (here Label A). The label may be more descriptive or include graphic elements. The garment model which is being tagged is identified, as well as the associated body model, garment size, and pose. In one embodiment, each of these elements may be generalized, if the tag is applicable to other body models, garment sizes, and/or poses. In one embodiment, when an element is generalized, the tag is applied to the associated versions of the garment as well. So, for example, this is the XL version of the garment but because size is generalized the same tag would appear in all sizes of the garment. In one embodiment, generalization may be limited, e.g. to size type (e.g. petite or plus size), size range (e.g. M-XL), etc. Similarly, the body model generalization may be limited as well. In one embodiment, the tags are searchable.

Figure 17:
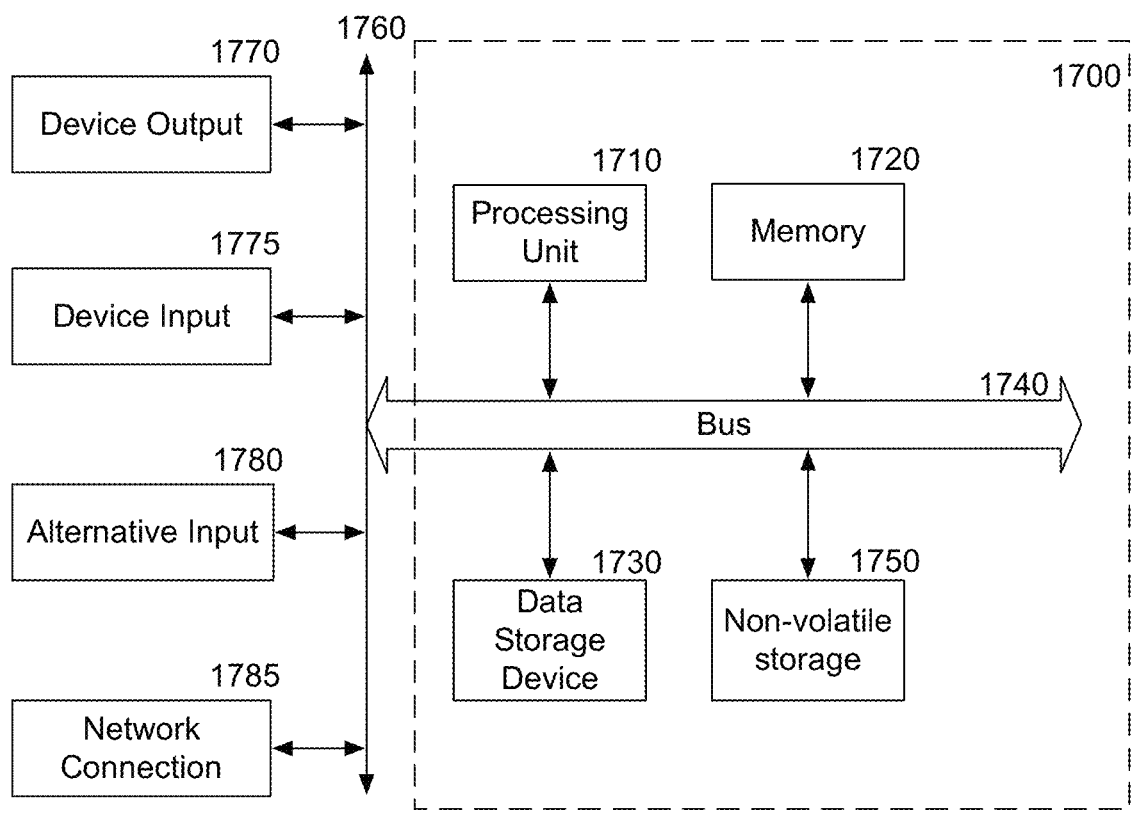
FIG. 17 is a computer system which may be used with the present application.

FIG. 17 is a block diagram of one embodiment of a computer system that may be used with the present invention. It will be apparent to those of ordinary skill in the art, however that other alternative systems of various system architectures may also be used.

The data processing system illustrated in FIG. 17 includes a bus or other internal communication means 1740 for communicating information, and a processing unit 1710 coupled to the bus 1740 for processing information. The processing unit 1710 may be a central processing unit (CPU), a digital signal processor (DSP), or another type of processing unit 1710.

The system further includes, in one embodiment, a random access memory (RAM) or other volatile storage device 1720 (referred to as memory), coupled to bus 1740 for storing information and instructions to be executed by processor 1710. Main memory 1720 may also be used for storing temporary variables or other intermediate information during execution of instructions by processing unit 1710.

The system also comprises in one embodiment a read only memory (ROM) 1750 and/or static storage device 1750 coupled to bus 1740 for storing static information and instructions for processor 1710. In one embodiment, the system also includes a data storage device 1730 such as a magnetic disk or optical disk and its corresponding disk drive, or Flash memory or other storage which is capable of storing data when no power is supplied to the system. Data storage device 1730 in one embodiment is coupled to bus 1740 for storing information and instructions.

The system may further be coupled to an output device 1770, such as a cathode ray tube (CRT) or a liquid crystal display (LCD) coupled to bus 1740 through bus 1760 for outputting information. The output device 1770 may be a visual output device, an audio output device, and/or tactile output device (e.g. vibrations, etc.)

An input device 1775 may be coupled to the bus 1760. The input device 1775 may be an alphanumeric input device, such as a keyboard including alphanumeric and other keys, for enabling a user to communicate information and command selections to processing unit 1710. An additional user input device 1780 may further be included. One such user input device 1780 is cursor control device 1780, such as a mouse, a trackball, stylus, cursor direction keys, or touch screen, may be coupled to bus 1740 through bus 1760 for communicating direction information and command selections to processing unit 1710, and for controlling movement on display device 1770.

Another device, which may optionally be coupled to computer system 1700, is a network device 1785 for accessing other nodes of a distributed system via a network. The communication device 1785 may include any of a number of commercially available networking peripheral devices such as those used for coupling to an Ethernet, token ring, Internet, or wide area network, personal area network, wireless network or other method of accessing other devices. The communication device 1785 may further be a null-modem connection, or any other mechanism that provides connectivity between the computer system 1700 and the outside world.

Note that any or all of the components of this system illustrated in FIG. 17 and associated hardware may be used in various embodiments of the present invention.

It will be appreciated by those of ordinary skill in the art that the particular machine that embodies the present invention may be configured in various ways according to the particular implementation. The control logic or software implementing the present invention can be stored in main memory 1720, mass storage device 1730, or other storage medium locally or remotely accessible to processor 1710.

It will be apparent to those of ordinary skill in the art that the system, method, and process described herein can be implemented as software stored in main memory 1720 or read only memory 1750 and executed by processor 1710. This control logic or software may also be resident on an article of manufacture comprising a computer readable medium having computer readable program code embodied therein and being readable by the mass storage device 1730 and for causing the processor 1710 to operate in accordance with the methods and teachings herein.

The present invention may also be embodied in a handheld or portable device containing a subset of the computer hardware components described above. For example, the handheld device may be configured to contain only the bus 1740, the processor 1710, and memory 1750 and/or 1720.

The handheld device may be configured to include a set of buttons or input signaling components with which a user may select from a set of available options. These could be considered input device #1 1775 or input device #2 1780. The handheld device may also be configured to include an output device 1770 such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

The present invention may also be embodied in a special purpose appliance including a subset of the computer hardware components described above, such as a VR suit, kiosk, or a vehicle. For example, the appliance may include a processing unit 1710, a data storage device 1730, a bus 1740, and memory 1720, and no input/output mechanisms, or only rudimentary communications mechanisms, such as a small touch-screen that permits the user to communicate in a basic manner with the device. In general, the more special-purpose the device is, the fewer of the elements need be present for the device to function. In some devices, communications with the user may be through a touch-based screen, or similar mechanism. In one embodiment, the device may not provide any direct input/output signals, but may be configured and accessed through a website or other network-based connection through network device 1785.

It will be appreciated by those of ordinary skill in the art that any configuration of the particular machine implemented as the computer system may be used according to the particular implementation. The control logic or software implementing the present invention can be stored on any machine-readable medium locally or remotely accessible to processor 1710. A machine-readable medium includes any mechanism for storing information in a form readable by a machine (e.g. a computer). For example, a machine readable medium includes read-only memory (ROM), random access memory (RAM), magnetic disk storage media, optical storage media, flash memory devices, or other storage media which may be used for temporary or permanent data storage. In one embodiment, the control logic may be implemented as transmittable data, such as electrical, optical, acoustical or other forms of propagated signals (e.g. carrier waves, infrared signals, digital signals, etc.).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

We claim:

1. A method of providing a VR and/or AR display for a clothing model, comprising:
    obtaining a body model of a user;
    receiving a garment selection;
    obtaining a garment model where the garment model was produced by using a physics simulation of the selected garment on the body model;
    representing the garment model using a set of parameterized basis vectors and weights;
    sending the representation and the body model to an AR and/or VR display device for displaying the body model and the garment model;
    enabling adding a tag, the tag associated with a location on the garment, a location on the body model, or a location on the garment and the body model.

2. The method of claim 1, wherein the tag is generalized across one or more of: all sizes of the garment, a subset of the sizes of the garment, no other sizes of the garment, all body shapes, a subset of the body shapes, no other of the body shapes, all poses, a subset of the poses, and no poses;
    wherein the tag is associated with the one or more sizes, one or more body shapes, and one or more poses.

3. The method of claim 1, wherein the tag has a status, and the tag status is one of: active, resolved, or informational.

4. The method of claim 1, wherein the tag has a type, and the tag type is one of: informational, instructive, and automatic, wherein automatic tags are processed by the system to update the garment model design.

5. A method of providing a VR and/or AR display for a clothing model comprising:
    obtaining a body model of a user;
    receiving a garment selection;
    obtaining a garment model where the garment model was produced by using a physics simulation of the selected garment on the body model;
    sending the representation and the body model to an AR and/or VR display device for displaying the body model and the garment model;
    enabling adding a tag, the tag associated with one of: a location on the garment,
    a location on the body model, or a location on the garment and the body model.

6. The method of claim 5, wherein the tag is generalized across one or more of: all sizes of the garment, a subset of the sizes of the garment, no other sizes of the garment, all body shapes, a subset of the body shapes, no other of the body shapes, all poses, a subset of the poses, and no poses;
    wherein the tag is associated with the one or more sizes, one or more body shapes, and one or more poses.

7. The method of claim 5, wherein the tag has a status, and the tag status is one of: active, resolved, or informational.

8. The method of claim 7, wherein active tags indicate that one or more actions should be taken in response to the tag.

9. The method of claim 5, wherein the tag has a type, and the tag type is one of: informational, instructive, and automatic, wherein automatic tags are processed by the system to update the garment model.

* * * * *